(12) United States Patent
Morita

(10) Patent No.: US 11,372,606 B2
(45) Date of Patent: Jun. 28, 2022

(54) SERVER SYSTEM

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 17/099,259

(22) Filed: Nov. 16, 2020

(65) Prior Publication Data

US 2021/0165620 A1    Jun. 3, 2021

(30) Foreign Application Priority Data

Nov. 28, 2019   (JP) .............................. JP2019-215443

(51) Int. Cl.
*G06F 3/12* (2006.01)
*G06F 21/33* (2013.01)
*G06F 21/60* (2013.01)

(52) U.S. Cl.
CPC .......... *G06F 3/1255* (2013.01); *G06F 3/1238* (2013.01); *G06F 3/1288* (2013.01); *G06F 21/33* (2013.01); *G06F 21/608* (2013.01)

(58) Field of Classification Search
None
See application file for complete search history.

(56) References Cited

U.S. PATENT DOCUMENTS

2019/0272131 A1*  9/2019  Matsui ................. G06F 3/1292

FOREIGN PATENT DOCUMENTS

JP    2017-111799 A    6/2017

* cited by examiner

*Primary Examiner* — Paul F Payer
(74) *Attorney, Agent, or Firm* — Canon U.S.A., Inc. IP Division

(57) ABSTRACT

A server system includes an acquisition unit configured to acquire a print setting from a different server system, and a transmission unit configured to transmit, to an image forming apparatus, print data in which a different print setting has been appended to the print setting acquired by the acquisition unit.

16 Claims, 18 Drawing Sheets

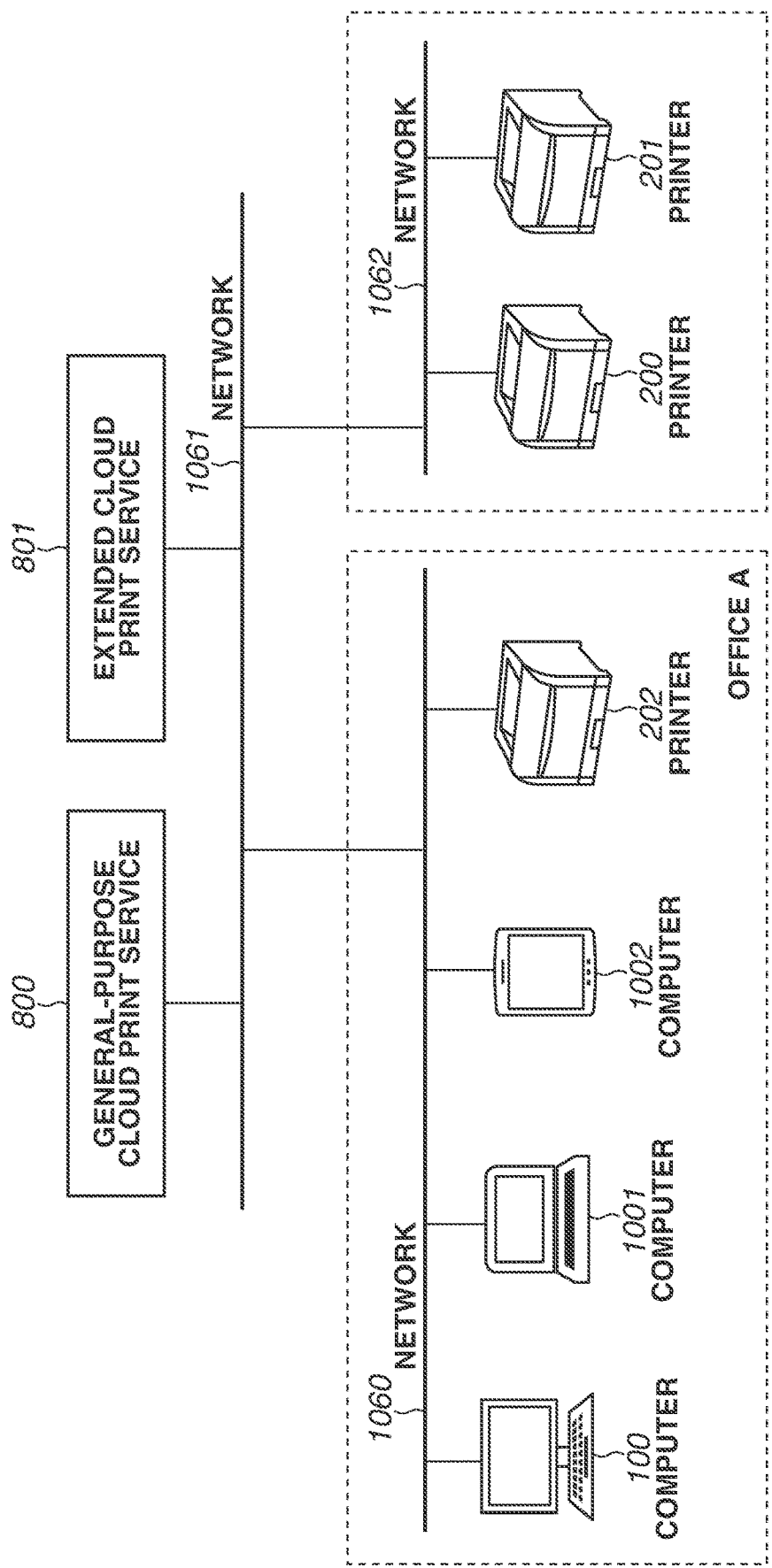

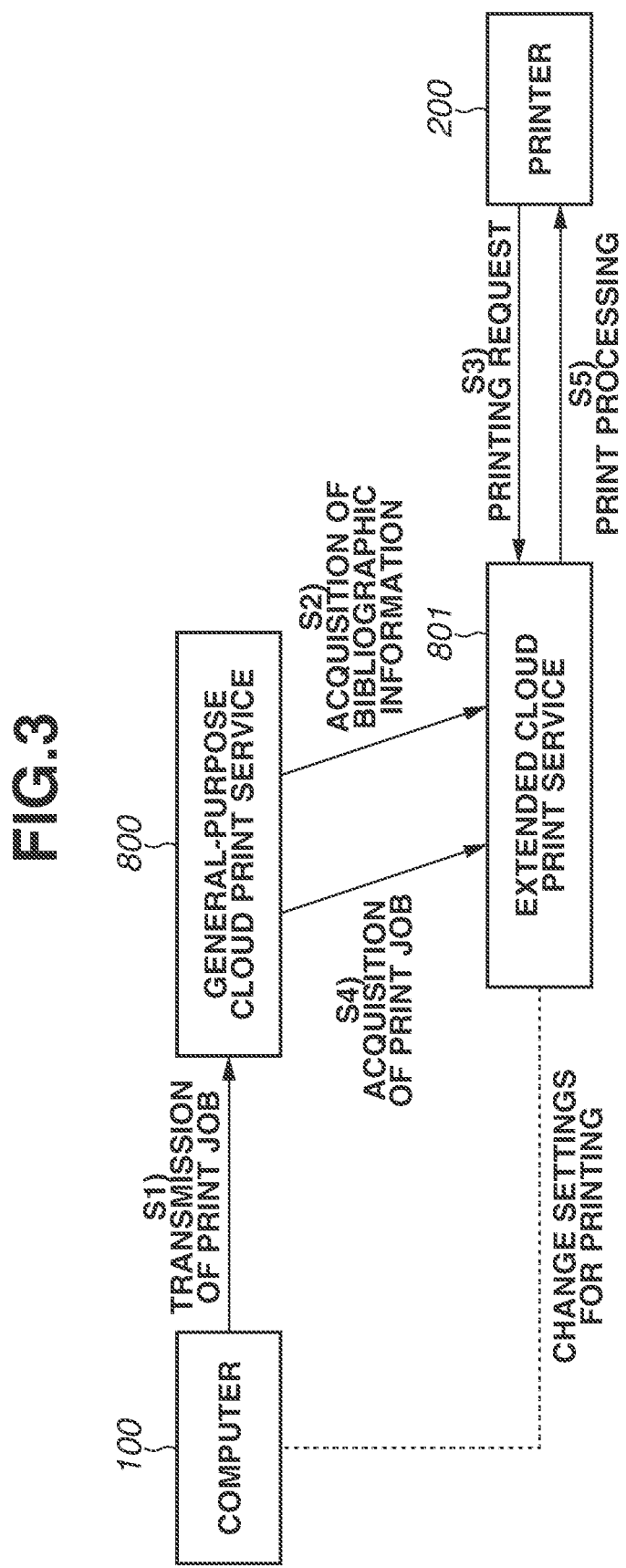

FIG.4

| | GENERAL-PURPOSE CLOUD PRINT SERVICE 800 | EXTENDED CLOUD PRINT SERVICE 801 |
|---|---|---|
| PAPER SIZE | ✓ | ✓ |
| NUMBER OF COPIES | ✓ | ✓ |
| PRINT ORIENTATION | ✓ | ✓ |
| PAGE IMPOSITION | ✓ | ✓ |
| COLOR | ✓ | ✓ |
| DUPLEX PRINTING | ✓ | ✓ |
| STAPLING | ✓ | ✓ |
| FORCED DUPLEX PRINTING | | ✓ |
| STAPLELESS STITCH | | ✓ |
| BLANK PAGE SKIP | | ✓ |
| BICOLOR PRINTING | | ✓ |
| TONER COVERAGE LEVEL | | ✓ |
| COLOR ADJUSTMENT | | ✓ |
| BRIGHTNESS | | ✓ |
| CONTRAST | | ✓ |

Rows PAPER SIZE through STAPLING: STANDARD SETTINGS 1800
Rows FORCED DUPLEX PRINTING through CONTRAST: EXTENDED SETTINGS 1801

FIG.7

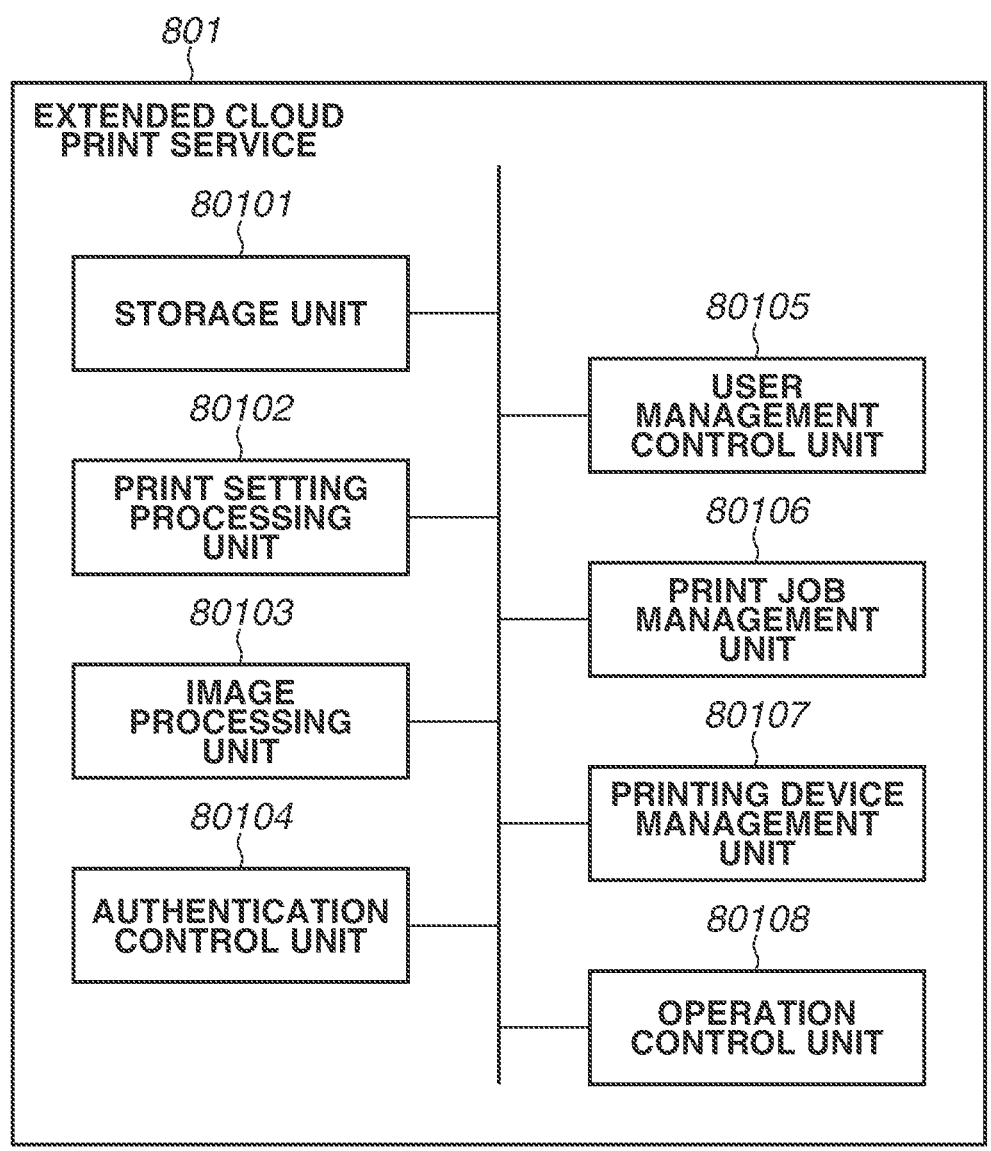

FIG.9A

| JOB MANAGEMENT INFORMATION | JOB ID |
|---|---|
| DOCUMENT INFORMATION | DOCUMENT NAME |
| | PRINTING DATE AND TIME |
| | PRINT SETTINGS |
| CLOUD PRINT SERVICE INFORMATION | ACCESS INFORMATION |
| | USER NAME |
| | ACCESS TOKEN |

FIG.9B

| PRINTER INFORMATION | ACCESS INFORMATION |
|---|---|
| | CUSTOMIZED INFORMATION |
| | TENANT INFORMATION |

FIG.12

```
{
    "PageMediaSize": "A4",
    "JobCopiesAllDocuments": 1,                    ~1201
    "PageOrientation": "Portrait",
    "PagesPerSheet": 1,
    "PageOutputColor": "Color",
    "DocumentDuplex": "OneSided", ~1203
    "DocumentStaple": "None", "AlwaysDuplex": "On", ~1204
    "DocumentStaplelessStitch": "None",            ~1202
    "JobBlankPageSkipMode": "Auto",
    "JobBiColor": "None",
    "JobTonerCoverageLevel": "Level2",
    "PageBrightnessAdjustment": 0,
    "PageContrastAdjustment": 20
     . . .
}
```

FIG.14

| PRINT SETTINGS | | BASIC SETTINGS | USER A | USER B |
|---|---|---|---|---|
| STANDARD SETTINGS | PAPER SIZE | A4 | | |
| | NUMBER OF COPIES | 1 | | |
| | PRINT ORIENTATION | PORTRAIT | | |
| | PAGE AGGREGATION | NONE | | |
| | COLOR MODE | MONOCHROME | | COLOR |
| | DUPLEX PRINTING | DUPLEX | | SIMPLEX |
| | STAPLING | NONE | | |
| | ⋮ | ⋮ | | |
| EXTENDED SETTINGS | FORCED DUPLEX PRINTING | ON | | OFF |
| | STAPLELESS STITCH | NONE | | |
| | BLANK PAGE SKIP | AUTO | | NONE |
| | BICOLOR PRINTING | OFF | | |
| | TONER SAVING | LEVEL 2 | | OFF |
| | BRIGHTNESS | 0 | | |
| | CONTRAST | 0 | | |
| | ⋮ | ⋮ | | |

SERVER SYSTEM

BACKGROUND

Field of the Disclosure

Aspects of the present disclosure generally relate to a server system.

Description of the Related Art

In a cloud print service, such as that discussed in Japanese Patent Application Laid-Open No. 2017-111799, printing is performed by the cloud print service transmitting, to an image forming apparatus, a print job input to the cloud print service by the user. This enables performing printing even if a client terminal, which is used to perform inputting of the print job, and the image forming apparatus are not present on the same network.

In such a printing system, it is necessary for the user to previously register an image forming apparatus with a tenant in the cloud print service. The tenant as mentioned herein is a group on the cloud print service. The user who uses the cloud print service is able to perform printing using the image forming apparatus registered with the tenant to which the user belongs.

The cloud print service as mentioned herein is, for example, a cloud print service known as, for example, Google Cloud® Print or Microsoft® Hybrid Cloud Print.

However, a general-purpose cloud print service is configured to conform to general standards so as to enable every image forming apparatus registered with the cloud print service to perform printing, and thus allows only standard settings such as the setting of the number of copies and the setting of imposition. Therefore, the general-purpose cloud print service is unable to allow settings for functions specific to the respective printer vendors, such as the setting of a finisher which varies with image forming apparatuses and the setting concerning optional features of image forming apparatuses.

On the other hand, there is also a cloud print service which enables performing printing of a print job to which an extended print setting which is not able to be dealt with by the general-purpose cloud print service has been appended. However, in the case of using such an extended print setting, the user is required to select a cloud print service which is able to deal with the extended print setting at the timing of inputting of a print job and then issue a printing instruction to the selected cloud print service. Therefore, if the user designates a general-purpose cloud print service and transmits a print job to the designated general-purpose cloud print service, printing would be performed without the extended print setting being applied to the print job.

SUMMARY

According, to embodiments of the present disclosure, a server system includes an acquisition unit configured to acquire a print setting from a different server system, and a transmission unit configured to transmit, to an image forming apparatus, print data in which a different print setting has been appended to the print setting acquired by the acquisition unit.

Further features of the present disclosure will become apparent from the following description of exemplary embodiments with reference to the attached drawings.

BRIEF DESCRIPTION OF THE DRAWINGS

FIG. 2 is a diagram illustrating an example of a configuration of the entire system in the first exemplary embodiment.

FIG. 3 is a diagram illustrating an example of a printing outline using cloud print services in the first exemplary embodiment.

FIG. 4 is a diagram illustrating print settings which are able to be set by a general-purpose cloud print service and print settings which are able to be set by an extended cloud print service in the first exemplary embodiment.

FIG. 7 is a diagram illustrating an example of a screen for displaying print jobs registered with the extended cloud print service, which is displayed on an image forming apparatus, in the first exemplary embodiment.

FIG. 8 is a diagram illustrating an example of software modules of the extended cloud print service in the first exemplary embodiment.

FIGS. 9A and 9B are diagrams each illustrating an example of a table which is managed by the extended cloud print service in the first exemplary embodiment.

FIG. 12 is a diagram illustrating an example of print setting information which is managed by the extended cloud print service in the first exemplary embodiment.

FIG. 14 is a diagram illustrating an example of a table which is used to manage default print settings on the extended cloud print service in the first exemplary embodiment.

DESCRIPTION OF THE EMBODIMENTS

Figure 1:
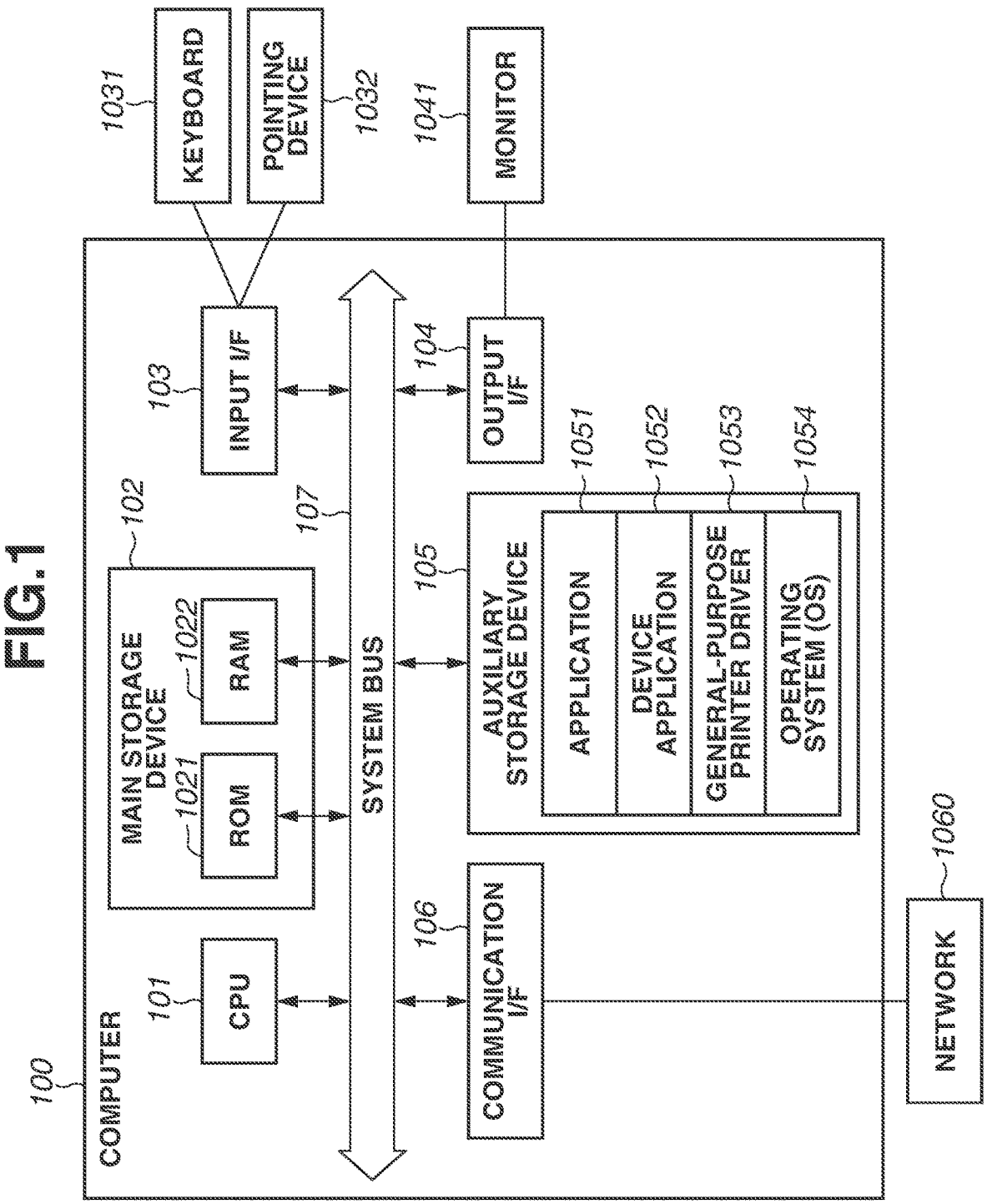
FIG. 1 is a diagram illustrating an example of a hardware configuration of a computer system in a first exemplary embodiment.

Various exemplary embodiments, features, and aspects of the disclosure will be described in detail below with reference to the drawings.

FIG. 2 is a diagram illustrating an example of a system configuration in a first exemplary embodiment.

Printers 100, 1001, and 1002, each of which is configured to generate a document or image to be printed, and a printer 202 are connected to a network 1060. The network 1060 is a network such as what is called a local area network (LAN) or a personal area network (PAN). While, here, a printer connected to the network 1060 is assumed to be the printer 202, the printer connected to the network 1060 can include a single printer or a plurality of printers.

A general-purpose cloud print service 800 and an extended cloud print service 801 are connected to a network 1061. The computer 100 communicates with the general-purpose cloud print service 800 and the extended cloud print service 801 via the networks 1060 and 1061. Each of the general-purpose cloud print service 800 and the extended cloud print service 801 is a server system composed of a single information processing apparatus or a plurality of information processing apparatuses.

Printers 200 and 201 are connected to a network 1062. Each of the printers 200 and 201 communicates with the general-purpose cloud print service 800 and the extended cloud print service 801 via the networks 1061 and 1062. Each of the printers 200 and 201 receives, via the general-purpose cloud print service 800 and the extended cloud print service 801, print data which the computer 100 has output as a printing instruction.

The communication method used for the computers 100, 1001, and 1002, the respective cloud print services 800 and 801, and the printers 200 and 201 is assumed to be a communication using a wireless LAN compliant with the IEEE 802.11 standard. The above-mentioned communication method is not specifically limited and can be, for example, a Bluetooth® communication or a communication including a mobile phone line compliant with the International Mobile Telecommunication 2000 (IMT-2000) standard. Moreover, with regard to Universal Serial Bus (USB), not only a form using direct connection but also a form using a relay such as a USB hub or switching equipment can be employed.

Moreover, in the description of FIG. 2, the network 1060 to which the computers 100, 1001, and 1002 and the printer 200 are connected, the network 1061 to which the general-purpose cloud print service 800 and the extended cloud print service 801 are connected, and the network 1062 to which the printers 200 and 201 are connected are different ones. The networks 1060, 1061, and 1062 can be one and the same network.

FIG. 1 illustrates an example of a hardware configuration of the computer 100 described in the first exemplary embodiment. A central processing unit (CPU) 101 controls the entire computer 100 according to programs stored in a main storage device 102 and an auxiliary storage device 105. A random access memory (RAM) 1022 is also able to be used as a work area by the CPU 101 performing various processing operations. The auxiliary storage device 105 stores various programs such as an application 1051, a device application 1052, a general-purpose printer driver 1053, and an operating system (OS) 1054. Input devices such as a keyboard 1031 and a pointing device 1032, which is typified by, for example, a mouse, a touch panel, or a touch-pad, are connected to the computer 100 via an input interface (I/F) 103. The computer 100 receives operations performed on the programs by the user via these input devices. Output devices such as a monitor 1041 are connected to an output I/F 104, so that a user interface (UI) is displayed on the monitor 1041 according to instructions from the programs. Furthermore, a touch panel in which the pointing device 1032 and the monitor 1041 are integrated with each other, such as a smartphone or a tablet, can be configured to be connected to the input I/F 103 and the output I/F 104. A communication I/F 106, which is connected to the network 1060, communicates with external devices for the computer 100, such as the computer 1001, the computer 1002, and the printer 202 illustrated in FIG. 2. The above-mentioned modules are interconnected by a system bus 107, so that exchange of data is able to be performed between the respective modules. Moreover, the application 1051, the device application 1052, the general-purpose printer driver 1053, and the OS 1054 described in the first exemplary embodiment are able to be added to the auxiliary storage device 105 via a compact disc read-only memory (CD-ROM) or a USB memory (each not illustrated). Additionally, the computer 100 is able to add the application 1051 to the auxiliary storage device 105 via the network 1061. Furthermore, unless otherwise described, as long as the functions of the present disclosure are able to be implemented, the present disclosure is naturally able to be applied to any configuration of apparatuses. The configuration of the computer 100 can be a single apparatus or a system composed of a plurality of apparatuses or can be a system in which connection and processing are performed via a local network.

Here, a software configuration of the extended cloud print service 801 is described with reference to FIG. 8. The extended cloud print service 801 is a service which is present in the cloud via the Internet, and enables providing functions concerning printing. The extended cloud print service 801 is a server system which has a hardware configuration similar to that of the computer 100 illustrated in FIG. 1 and is composed of a single information processing apparatus or a plurality of information processing apparatuses. Various software blocks illustrated in FIG. 8 are implemented by a CPU executing a program stored in a ROM or auxiliary storage device.

Part or all of the processing units illustrated in FIG. 8 can be present on a different cloud print service which cooperates with the extended cloud print service 801. While the following description is performed with the printer 200 taken as an example, even the printer 201 or the printer 202, which is able to connect to the extended cloud print service 801, is also able to implement similar processing.

In response to an instruction from another control unit, a storage unit 80101 stores designated data in a storage region managed in the cloud, or reads out data stored in the storage region. Examples of data which the storage unit 80101 manages include print data including print jobs, information about the cloud print service, and management information about connected printers. FIG. 9A illustrates a table used to manage information about a print job stored in the storage unit 80101. Information "job ID" of "job management information" is identification information allocated to a print job for the purpose of uniquely dealing with a job between services or devices starting with inputting of a print job and ending with completion of printing. Furthermore, as long as consistency is ensured as a whole, conversion of a value of the job ID, such as "an alphabet being appended to a numerical ID", is assumed to be allowed on the way. Moreover, the job ID can be configured with a plurality of IDs, such as an ID which is dealt with as a whole and an ID which is dealt with in an internal manner. Next, information "document name" of "document information" represents the file name of a file serving as a target for printing, and is treated as a display name used for discriminating which document the user printed. The document name does not change even if print data is converted. Furthermore, the document name does not necessarily need to coincide with the file name of document data, and can be a different name which the user expressly designated. Information "printing date and time" stores the time of inputting of a job of which the user performed printing. Thus, the information "printing date and time" is a value for indicating when input a print job the print job concerned is. Therefore, even if, after printing, the extended cloud print service 801 access a job and make some changes to the job, the printing date and time is not updated. Furthermore, the clock time of updating, which indicates the clock time when the extended cloud print service 801 changed, for example, print settings, is stored in a region different from the region for the clock time of printing. Information "print settings" stores settings related to printing, such as "paper size" and "number of copies", which are set for a print job.

Information "access information" of "cloud print service information" is information for identifying the general-purpose cloud print service 800, which is an external cooperation partner. The access information is, for example, the Uniform Resource Locator (URL) or the Internet Protocol (IP) address of the general-purpose cloud print service 800. In a case where, for example, the general-purpose cloud print service 800 is present not on the outside but within one system, the access information can be something like a reference to an instance of the service. Information "user name" is the user name of a user who uses the extended cloud print service 801. Information "access token" is a token used for the extended cloud print service 801 to access the general-purpose cloud print service 800. The information "access token" can be a "password" for logging in to the general-purpose cloud print service 800.

FIG. 9B illustrates a printer information table which is stored in the storage unit 80101. Information "access information" is information required for the extended cloud print service 801 to access a printer. Specifically, the access information is port information about a printer including an IP address and a Web Services for Devices (WSD) port. Moreover, in a case where a dynamic IP address is allocated to the access information and the access information may undergo a change, the access information can additionally store information capable of uniquely identifying a terminal, such as a media access control (MAC) address or a volume serial number of a hard disk. Information "customized information" stores information about changes made to a printer, such as information about a hardware configuration attached to the primer or information about capabilities such as "Is stapling available?". Moreover, in a case where the user has previously customized default values of print settings of the printer, such information is also stored as the customized information. Information "tenant information" is information about a system which, in a case where the printer is managed by a specific print server or printing system, serves as a management source for the printer. A print setting processing unit 80102 performs processing concerning print settings.

An image processing unit 80103 performs processing for rendering image data or intermediate data for printing of a print job. Moreover, the image processing unit 80103 also performs, as needed, conversion processing for document formats for converting the data format of data to be printed into, for example, the Portable Document Format (PDF) format.

An authentication control unit 80104 manages authentication for the extended cloud print service 801 using an identification (ID) and a password, login information for a browser using a cookie, and authentication information using an access token acquired by an application. The ID as used herein represents a user name used for performing login authentication. Furthermore, in the case of a guest account, the ID can be omitted, can be a temporarily allocated ID, or can be an ID allocated by default processing such as "unknown". Moreover, while the password is described as a passphrase used for the user to perform authentication, a pattern authentication, which is performed by a mouse or finger tracing the surface of a screen, an image authentication, a voice authentication, a biometric authentication, or data corresponding to authentication token information about a target application and a link to the data can also be employed. Besides, an authentication using a physical device or tool, such as reading an integrated circuit (IC) card, a magnetic card, a barcode, or a QR Code®, can be employed. Additionally, any method can be employed as long as it has a scheme capable of sharing a login session including single sign-on. A user management control unit 80105 manages user information.

A print job management unit 80106 accesses the table for managing a print job illustrated in FIG. 9A, and thus manages information about a print job received by the extended cloud print service 801. Moreover, the print job management unit 80106 also performs synchronization of the contents of a print job which is also referred to by the external general-purpose cloud print service 800 or the printer 200.

A printing device management unit 80107 accesses the table for managing printer information illustrated in FIG. 9B, and thus manages printer information about devices which are managed by the extended cloud print service 801.

The operation control unit 80108 is a module for generating a screen to be displayed on the computer 100 and causing the computer 100 to display the generated screen. Moreover, the operation control unit 80108 transfers an input received via the computer 100 to another control unit. In the present exemplary embodiment, for example, the operation control unit 80108 is assumed to generate a markup language, such as HyperText Markup Language (HTML), used for performing displaying of a print setting screen on a web browser.

In the first exemplary embodiment, the user causes the computer 100 to transmit a print job to a print queue of the extended cloud print service 801 on the general-purpose cloud print service 800. Then, the user performs printing using the printer 200 registered with the extended cloud print service 801. Furthermore, the purpose of using the extended cloud print service 801 in the first exemplary embodiment is to extend print settings which are not able to be set by the general-purpose cloud print service 800.

FIG. 4 illustrates a table showing print settings which are able to be set by the general-purpose cloud print service 800 and print settings which are able to be set by the extended cloud print service 801, in the first exemplary embodiment.

The standard settings 1800 are print settings which are able to be set by each of the general-purpose cloud print service 800 and the extended cloud print service 801. The standard settings 1800 are print settings which are able to be dealt with by many image forming apparatuses, such as "paper size", "number of copies", and "color". On the other hand, the extended settings 1801 are setting items which are specific to a printer vendor, such as "forced duplex printing", in which duplex printing is always performed, "stapleless stitch", in which sheets of paper are bound without use of staples, and "blank page skip", in which printing of a blank page is skipped. The extended settings 1801 includes, in addition to the above-mentioned ones, for example, "bicolor printing", in which toner or ink to be used for printing is limited to two colors, "toner coverage level" setting, and settings of color, brightness, and contrast of an image.

The general-purpose cloud print service 800 is able to set only the settings which are able to be deal with by many image forming apparatuses, such as the standard settings 1800 illustrated in FIG. 4. Therefore, print settings are extended by the extended cloud print service 801 adding the extended settings 1801, which are settings concerning specifications specific to each printer vendor and optional functions attached to image forming apparatuses. For example, the general-purpose cloud print service 800 is not able to set print settings such as "forced duplex printing", in which duplex printing is always performed, and "stapleless stitch", in which sheets of paper are bound without use of staples. Therefore, setting of the extended settings 1801 such as "forced duplex printing" and "stapleless stitch" is added by relaying a print job input to the general-purpose cloud print service 800 to the extended cloud print service 801. With this processing, even in a case where the user uses the general-purpose cloud print service 800, it becomes possible to add and apply extended print settings specific to a printer vendor.

Here, a method of registering the printer 200 with the extended cloud print service 801 is described.

The printer 200 transmits a registration request to the extended cloud print service 801. The extended cloud print service 801 causes the printer 200 to display, on the touch panel thereof, a screen used for inputting a user name and a password. When the user operates the printer 200 to input a user name and a password, the extended cloud print service 801 performs authentication using the input user name and password. When authentication is successful, the extended cloud print service 801 stores information about the printer 200 while associating the information with a tenant to which the logged-in user belongs. In this case, the printer 200 registered with the extended cloud print service 801 is published as a virtual shared printer having the name of, for example, "Cloud Printer". When the user designates "Cloud Printer" and issues an instruction for printing, the user is able to perform printing using the printer registered with the extended cloud print service 801.

Next, a procedure for registering a virtual shared printer included in the extended cloud print service 801 with the general-purpose cloud print service 800 is described. Registration with the general-purpose cloud print service 800 is performed via a management screen such as that illustrated in FIG. 5.

The user operates the computer 100 to access the general-purpose cloud print service 800, inputs the user name and the password, and thus logs in to the general-purpose cloud print service 800. Then, the user operates the computer 100 to cause the device management screen of the general-purpose cloud print service 800 to be displayed on the computer 100. In the device management screen, a print queue of a printer registered with the general-purpose cloud print service 800 is displayed. When the user selects a search button 501 in the device management screen, the general-purpose cloud print service 800 searches for an image forming apparatus which is able to be registered. For example, when the user selects the search button 501, the general-purpose cloud print service 800 displays, in the device management screen, a screen used for inputting the IP address of a printer to be registered. The general-purpose cloud print service 800 displays, as a New Device, a printer in which the function of a web service print corresponding to the IP address input by the user is enabled or a printer which is shared and published on the network. In a case where the printer corresponding to the IP address is a print queue on the extended cloud print service 801, "Cloud Printer" such as an item 502 is displayed as a result of search. While, here, the general-purpose cloud print service 800 searches for a printer with use of the IP address input by the user, the general-purpose cloud print service 800 can be configured to search for a printer with use of a URL allocated to each printer.

A printer found by searching on the extended cloud print service 801 is displayed as "New Device". The user selects a printer to be registered with the general-purpose cloud print service 800 from among printers displayed as "New Device", and then presses "Add Printer" to register the selected printer.

Besides the above-mentioned method, the following method can be employed to add a print queue on the extended cloud print service 801 to the general-purpose cloud print service 800.

Figure 5:
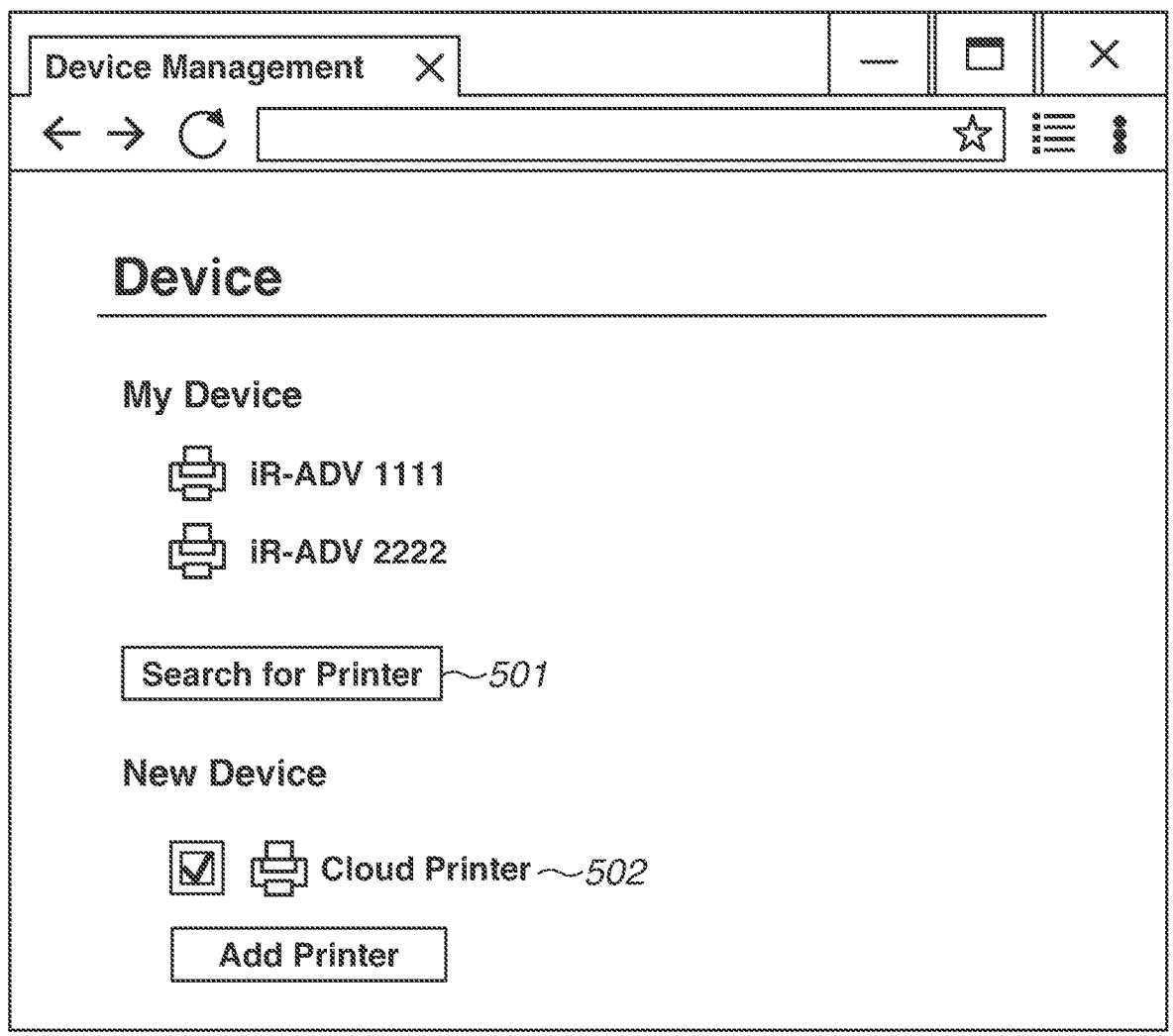
FIG. 5 is a diagram illustrating an example of an operation screen used to register the extended cloud print service with the general-purpose cloud print service in the first exemplary embodiment.

A button used for cooperating with another extended cloud print service is displayed in the screen illustrated in FIG. 5. When the user selects the displayed button, a screen used for selecting an extended cloud print service targeted for cooperation is displayed on the monitor 1041 of the computer 100. When the user selects an extended cloud print service targeted for cooperation, the general-purpose cloud print service 800 transmits a request for issuance of an access token to an authorization server of the selected extended cloud print service. The authorization server displays, on the monitor 1041 of the computer 100, an input screen for a user name and a password of the selected extended cloud print service. The authorization server performs authentication using the input user name and password, and inquires of the user whether to permit an access request from the general-purpose cloud print service 800. In a case where the access has been permitted by the user, the authorization server issues an access token to the general-purpose cloud print service 800. Since then, the general-purpose cloud print service 800 becomes able to access the selected extended cloud print service. The general-purpose cloud print service 800 acquires information about a print queue of the selected extended cloud print service with use of the access token received from the authorization server, and displays such information on the screen illustrated in FIG. 5.

Thus, the user becomes able to input a print job to a print queue on the extended cloud print service 801 via the general-purpose cloud print service 800.

Next, a method of inputting a print job from the computer 100 to the extended cloud print service 801 via the general-purpose cloud print service 800 is described with reference to FIG. 6A.

Figure 6A:
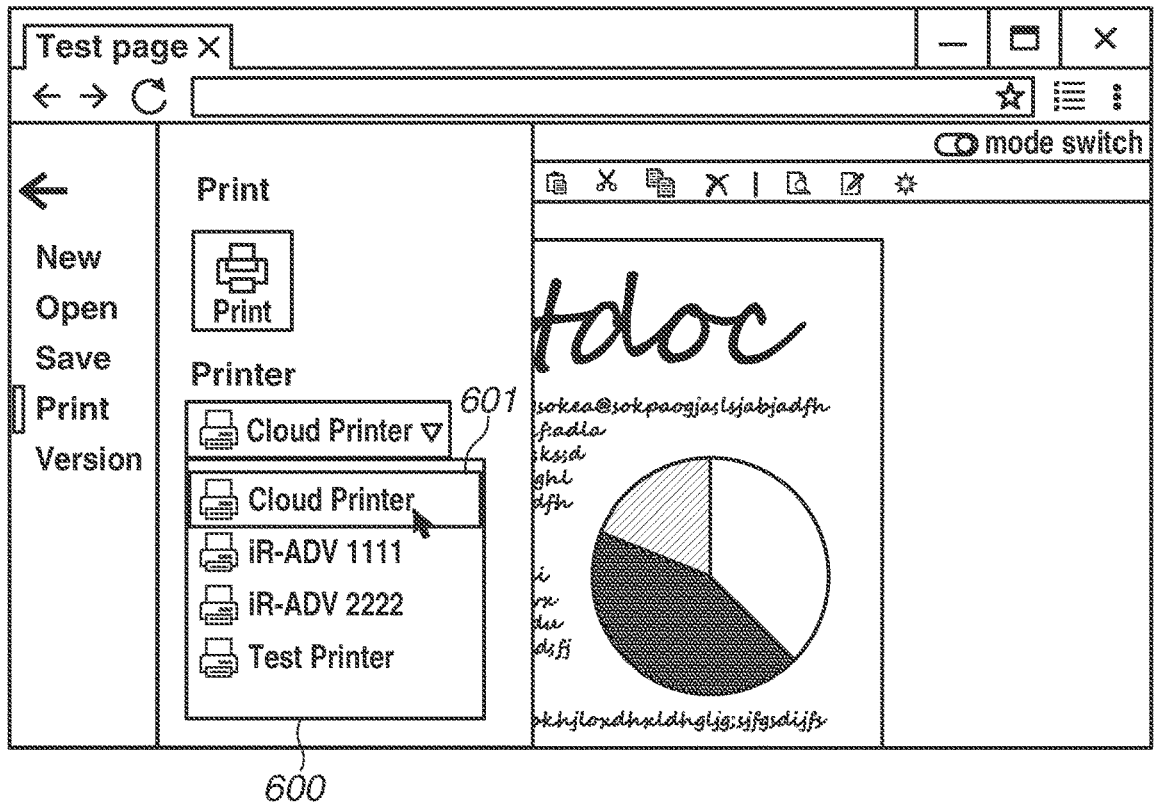
FIGS. 6A and 6B are diagrams each illustrating an example of an operation screen used to perform printing using a printer registered with the general-purpose cloud print service by an application in the first exemplary embodiment.

FIG. 6A illustrates an example of a display screen which is displayed in the case of performing printing using the general-purpose cloud print service 800. The user logs in to the general-purpose cloud print service 800, and selects a file to be printed. The general-purpose cloud print service 800 displays, in a list 600, the names of print queues registered with the general-purpose cloud print service 800. The displayed print queues include a print queue 601 of the virtual printer 502 registered with the extended cloud print service 801.

Figure 6B:
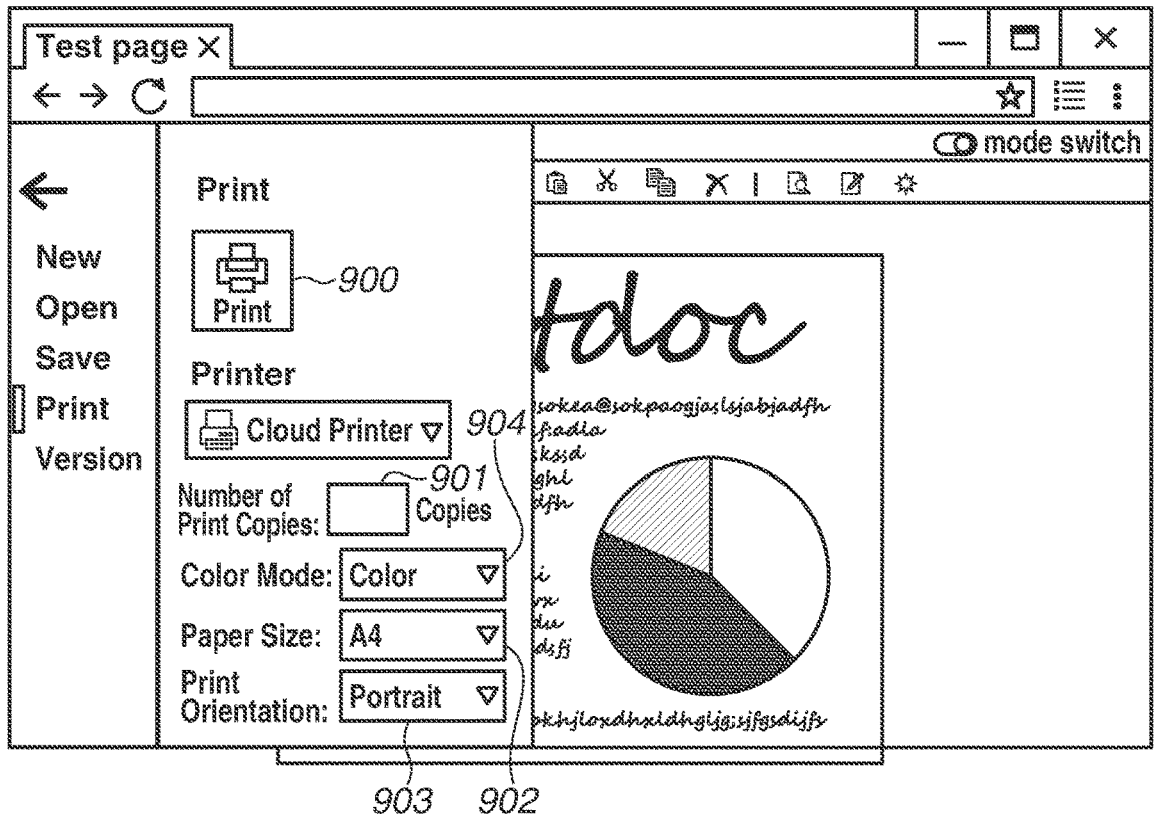

FIG. 6B illustrates an example of a print setting screen which the general-purpose cloud print service 800 provides. A "Print" button 900 is a button used to issue an instruction for printing. When the user selects the "Print" button 900, the general-purpose cloud print service 800 generates a print job. A "number of print copies" setting field 901 is a button used for the user to set the number of print copies. A "color mode" field 904 is a field used to select one of color printing and monochrome (black-and-white) printing. A "paper size" field 902 is a field used to set the size of a sheet of paper to be output. A "print orientation" field 903 is a field used to set whether to output print data in a portrait (vertically long) orientation or in a landscape (horizontally long) orientation. The general-purpose cloud print service 800 is able to set, in addition to the print settings illustrated in FIG. 6B, print settings shown in the standard settings 1800 illustrated FIG. 4. On the other hand, the general-purpose cloud print service 800 is not able to set print settings shown in the extended settings 1801 illustrated in FIG. 4.

Next, a procedure for printing a print job which the user has input to a virtual printer of the extended cloud print service 801 registered with the general-purpose cloud print service 800 is described with reference to FIG. 7. When the user logs in to the printer 200, the printer 200 logs in to the extended cloud print service 801. The printer 200 acquires bibliographic information about print jobs stored in the extended cloud print service 801, and displays the acquired bibliographic information on a display unit of the printer 200. The bibliographic information about print jobs stored in the extended cloud print service 801 is displayed in a job list 701. In the job list 701, both print jobs which have been directly input from the computer 100 to the extended cloud print service 801 and print jobs which have been input to the extended cloud print service 801 via the general-purpose cloud print service 800 are displayed. When, in the job list 701, the user selects a print job to be executed, the background color of the selected print job is inverted in the job list 701. Then, when the user selects a "print" button 702, the selected print job is executed. When, in the state in which the print job is selected, a "delete" button 703 is selected, the selected print job is deleted.

With these procedures taken into consideration, the outline of operations leading to printing in the first exemplary embodiment is described with reference to FIG. 3. Furthermore, the user previously causes the computer 100 to register print settings with the extended cloud print service 801. Referring to FIG. 3, the extended cloud print service 801 appends the previously set extended settings 1801 to a print job acquired from the general-purpose cloud print service 800.

First, in step S1, the user designates the print queue 601 illustrated in FIG. 6A via the application of the computer 100, and issues an instruction for execution of printing. In this case, print data can be generated on the computer 100 of the user, or data about a document can be directly uploaded in an internal manner. After a print job is stored in the general-purpose cloud print service 800, then in step S2, the extended cloud print service 801 acquires bibliographic information about the prim job input to the general-purpose cloud print service 800. Here, the bibliographic information targeted for acquisition is information needed for managing a document, such as a document name, printing date and time, and print settings. At this time, the extended cloud print service 801 adds extended settings specific to a vendor to information about the print settings acquired from the general-purpose cloud print service 800. This causes the bibliographic information with the extended settings 1801 reflected therein to be stored in the extended cloud print service 801.

After that, the user operates the printer 200 to advance the printer 200 to an operation for performing printing. The user selects a print job targeted for printing in the job list 701 (FIG. 7) on the printer 200, and issues an instruction for execution of printing. In step S3, an image forming apparatus which has received a printing execution instruction from the user transmits a printing request for the selected print job to the extended cloud print service 801. In step S4, the extended cloud print service 801, which has received the printing request, acquires, from the general-purpose cloud print service 800, the print job of which an instruction for printing has been issued. In step S5, the extended cloud print service 801 re-generates print data based on the received print job and the stored print setting information, and transmits the generated print data to the printer 200.

With the above-described processing performed, even in printing to be performed via the general-purpose cloud print service 800, it is possible to perform printing in which the print settings which are not able to be set by the general-purpose cloud print service 800 have been reflected.

A sequence of print processing on cloud print services is described with reference to FIGS. 10A and 10B.

In step S1001, the user operates the computer 100 to access the extended cloud print service 801 and registers print settings. The user uses a web browser to access the URL of the extended cloud print service 801 and log in to the extended cloud print service 801 with use of a user name and a password. Then, the user sets the basic print settings or the print settings individual for the user on the extended cloud print service 801. FIG. 14 illustrates a print setting table which is managed by the extended cloud print service 801. The print setting table has, stored therein, the basic print settings and the print settings individual for each user. The basic print settings are print settings which the administrator of the extended cloud print service 801 sets. The print settings individual for each user are print settings which are used when a user who has logged in to the extended cloud print service 801 performs printing. The extended cloud print service 801 retains default values with respect to "standard settings" and "extended settings". The column "basic settings" illustrated in FIG. 14 indicates default values set to the extended cloud print service 801. Furthermore, the default setting values can be factory shipment values or customized values set by the administrator. Moreover, the extended cloud print service 801 can manage settings while defining a hierarchy on a plurality of setting groups, such as "for each company" or "for each department". The individual settings indicate default values which are managed for each user. Referring to FIG. 14, there are individual settings for "user A" and "user B". In the individual settings, with respect to each item in which a setting value is not set, a value set in the basic settings is used. For example, with respect to "user A", no setting item is set. Therefore, when the user A performs printing, values set in the basic settings are used. Moreover, with respect to "user B", items for "color mode" and "duplex printing" are individually set in a separate manner. When the user B performs printing, setting values set by the user B are used. However, with respect to "stapleless stitch" and "bicolor printing", which are print settings of which the user B has not performed setting, setting values in the basic settings are applied.

In step S1002, the computer 100 instructs the extended cloud print service 801 to cooperate with the general-purpose cloud print service 800. In step S1003, the extended cloud print service 801 transmits an authorization request to the authorization server of the general-purpose cloud print service 800. In step S1004, the general-purpose cloud print service 800 transmits the authorization request to the computer 100. Moreover, in step S1004, the general-purpose cloud print service 800 causes the computer 100 to display a screen for inputting a user name and a password for the general-purpose cloud print service 800. In step S1005, the computer 100 transmits the user name and password input by the user to the general-purpose cloud print service 800. In step S1006, the general-purpose cloud print service 800 performs authentication processing with use of the input user name and password. When authentication is successful, then in step S1007, the authorization server of the general-purpose cloud print service 800 generates an access token, and transmits the access token to the extended cloud print service 801. Since then, the extended cloud print service 801 accesses the general-purpose cloud print service 800 with use of the access token.

Figure 11:
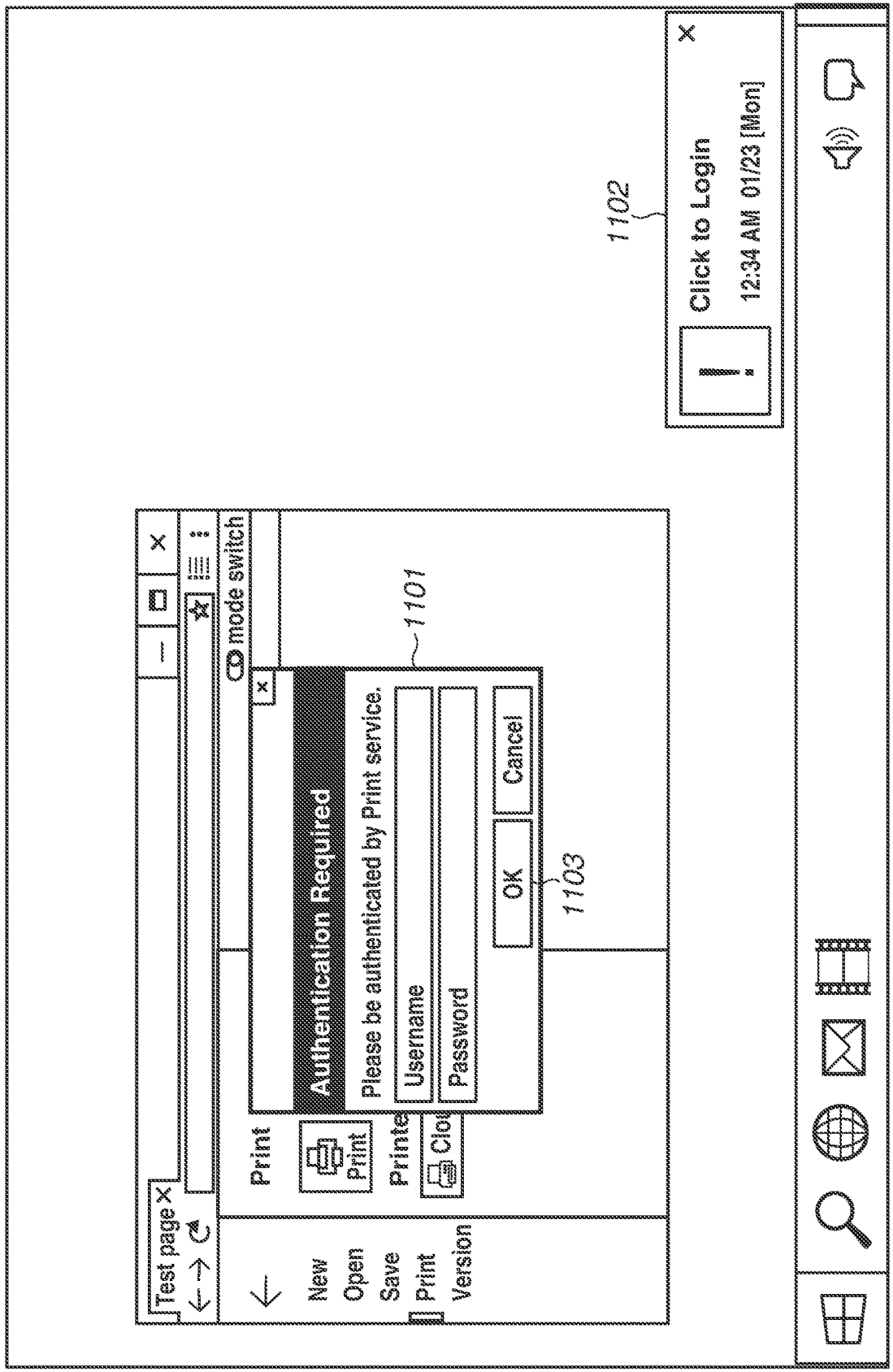
FIG. 11 is a diagram illustrating an example of an operation screen used to log in from a computer to the extended cloud print service in the first exemplary embodiment.

In step S1008, the computer 100 transmits a login request to the general-purpose cloud print service 800. The computer 100 transmits the user name and the password to the general-purpose cloud print service 800. Naturally, if authentication has already been performed, the present processing can be omitted. Moreover, with regard to timing, not only at the time of using the system but also at the timing of pressing a print button to issue a printing instruction, an authentication request can be performed in the form of, for example, an authentication request screen 1101 illustrated in FIG. 11. The authentication request screen 1101 is a screen used for the user to input a user name and a password for the general-purpose cloud print service 800. When the user inputs the user name and the password and selects an "OK" button 1103, authentication is performed. Moreover, a configuration in which the authentication request screen 1101 is displayed for authentication by putting out a notification message 1102 via the OS at the timing when the system separately requires authentication and causing the user to click the notification message 1102 can be employed.

In step S1009, the general-purpose cloud print service 800 performs authentication processing with use of the user name and password received from the computer 100, and communicates an authentication result to the computer 100. In the sequence illustrated in FIGS. 10A and 10B, the general-purpose cloud print service 800 returns an authentication success to the computer 100.

After performing authentication, in step S1010, the computer 100 selects a print queue of the virtual printer of the extended cloud print service 801 registered with the general-purpose cloud print service 800, and transmits a printing instruction to the general-purpose cloud print service 800. The present processing can be performed by the application 1051 included in the computer 100, or can be performed by a web application or a printing service present on the Web. Moreover, the present processing can be merely uploading a file as long as the file is managed as a print job on a cloud print service. The general-purpose cloud print service 800 receives the printing instruction, and generates page-description language (PDL) data and bibliographic information for use in printing. The PDL data includes setting values for standard printing and drawing data. The bibliographic information includes a print job ID for discriminating a print job, a user name, the name of a document of which an instruction for printing has been issued, and information about the date and time at which the printing instruction was issued.

In step S1011, the extended cloud print service 801 requests information about a print job, such as bibliographic information and print settings, from the general-purpose cloud print service 800. Furthermore, the extended cloud print service 801 accesses a print queue of the virtual printer of the general-purpose cloud print service 800 at intervals of a predetermined time, and inquires of the general-purpose cloud print service 800 whether there is a new print job. In a case where there is a new print job in the print queue of the virtual printer, the extended cloud print service 801 acquires bibliographic information and print settings about the new print job. The method used in step S1011 does not need to be the above-mentioned method. For example, an event in which, when a print job is registered with a print queue of the virtual printer of the general-purpose cloud print service 800, the general-purpose cloud print service 800 communicates that effect to the extended cloud print service 801 can be previously registered. In this case, the extended cloud print service 801 performs processing in step S1011 based on a communication from the general-purpose cloud print service 800.

In step S1012, the general-purpose cloud print service 800 transmits information about the print job to the extended cloud print service 801. Here, the extended cloud print service 801 receives a print setting portion and bibliographic information of PDL data included in the print job generated by the general-purpose cloud print service 800. A portion 1201 illustrated in FIG. 12 represents an example of print settings which are acquired from the general-purpose cloud print service 800. To prevent an influence on the data capacity of a storage of the extended cloud print service 801, here, the extended cloud print service 801 does not perform acquisition of image data to be printed.

In step S1013, the extended cloud print service 801 adds setting information about extended settings to the received information. A portion 1202 illustrated in FIG. 12 represents an example of extended settings which are added by the extended cloud print service 801. The portions 1201 and 1202 illustrated in FIG. 12 represent, in combination, print settings in which the extended settings are set in step S1013.

In step S1014, the extended cloud print service 801 performs validation processing of the print settings and updating of the print job information.

Thus far is the description of processing concerning inputting of a print job. In the following description, a sequence about execution of printing is described.

First, in step S1015, the printer 200 receives inputting of a user name and a password from the user and performs authentication processing. Furthermore, the printer 200 can perform authentication using another authentication method such as that described in an example using the authentication control unit 80104 of the extended cloud print service 801.

In step S1016, the printer 200 transmits an acquisition request for bibliographic information about the print job to the extended cloud print service 801. In a case where the printer 200 previously stores a user name and a password for the extended cloud print service 801, the printer 200 logs in to the extended cloud print service 801 with use of the stored user name and password. In a case where the printer 200 does not previously store a user name and a password for the extended cloud print service 801, the printer 200 displays, on a display unit thereof, a screen for inputting a user name and a password for the extended cloud print service 801. Then, the printer 200 logs in to the extended cloud print service 801 with use of the input user name and password to acquire bibliographic information. Furthermore, in a case where the printer 200 does not previously store a user name and a password for the extended cloud print service 801, the printer 200 can be configured to access the authorization server of the extended cloud print service 801 to acquire an access token. In that case, for example, acquisition of a print job is performed with use of the acquired access token.

In step S1017, the extended cloud print service 801, which has received the request for bibliographic information, transmits bibliographic information about the print job to the printer 200. The bibliographic information which the extended cloud print service 801 transmits in step S1017 is minimum processing information, such as "document name" and "printing date and time", required for displaying of the job list 701 illustrated in FIG. 7. Moreover, if needed for displaying, the printer 200 further acquires additional information such as "number of copies" or "color" information included in "print settings".

In step S1018, the printer 200 receives selection of a print job and an instruction for starting printing from the user, and transmits a printing request to the extended cloud print service 801. The extended cloud print service 801 determines whether the print job of which an instruction for printing has been issued is a print job registered with the virtual printer of the general-purpose cloud print service 800, based on the information illustrated in FIGS. 9A and 9B which is stored in the storage unit 80101. Thus, the extended cloud print service 801 determines whether the prim job is a job stored in the general-purpose cloud print service 800, based on the access information included in the cloud print service information of the table illustrated in FIG. 9A.

In step S1019, the extended cloud print service 801 transmits a request for print job information including not only bibliographic information but also other information to the general-purpose cloud print service 800. In step S1020, the general-purpose cloud print service 800 transmits a print job designated by the extended cloud print service 801 to the extended cloud print service 801. Here, the print job which the general-purpose cloud print service 800 transmits includes both PDL data and bibliographic information for use in printing.

In step S1021, the extended cloud print service 801, which has received the print job, applies the retained print settings to the print job. Specifically, in step S1021, the extended cloud print service 801 updates the portion 1201 of print settings illustrated in FIG. 12 based on a comparison made between a standard setting portion of the stored print settings and standard settings included in PDL data included in the received print job. Then, the extended cloud print service 801 rewrites the print settings included in PDL data into print settings including both the updated standard settings and the extended settings. This enables reflecting the extended settings in the print job generated by the general-purpose cloud print service 800.

In step S1022, the extended cloud print service 801 transmits an acquisition completion notification for the print job to the general-purpose cloud print service 800. In step S1023, upon receiving the acquisition completion notification for the print job, the general-purpose cloud print service 800 deletes the print job from the print queue of the virtual printer. Additionally, the general-purpose cloud print service 800 can set the status of the print job to completion of printing.

In step S1024, the extended cloud print service 801 transmits the print job to the printer 200. The print job which the extended cloud print service 801 transmits to the printer 200 in step S1024 is a prim job in which both the standard settings and the extended settings have been set. At this time, in a case where a setting which the printer 200 is not able to process is included in the print settings transmitted from the extended cloud print service 801 to the printer 200, processing such as discarding or rounding the setting is performed. For example, even if a print setting of "duplex" is designated with respect to a type of printer having only a simplex printing function, the print setting is processed as "simplex", and, in a case where a special designation such as "two colors of red and blue" is performed on color setting, the print setting is rounded to a setting which is able to be interpreted as "color" or "monochrome". Moreover, with respect to a setting which may cause an inconvenience if arbitrarily changed, such a setting for paper size, for example, A4, a selection screen for settings can be displayed on the display panel of the printer 200, so that the user can be allowed to perform selection. Upon completion of printing for the print job, in step S1025, the printer 200 transmits a printing completion notification to the extended cloud prim service 801. Upon receiving the printing completion notification, in step S1026, the extended cloud print service 801 deletes the print job.

Figure 10A:
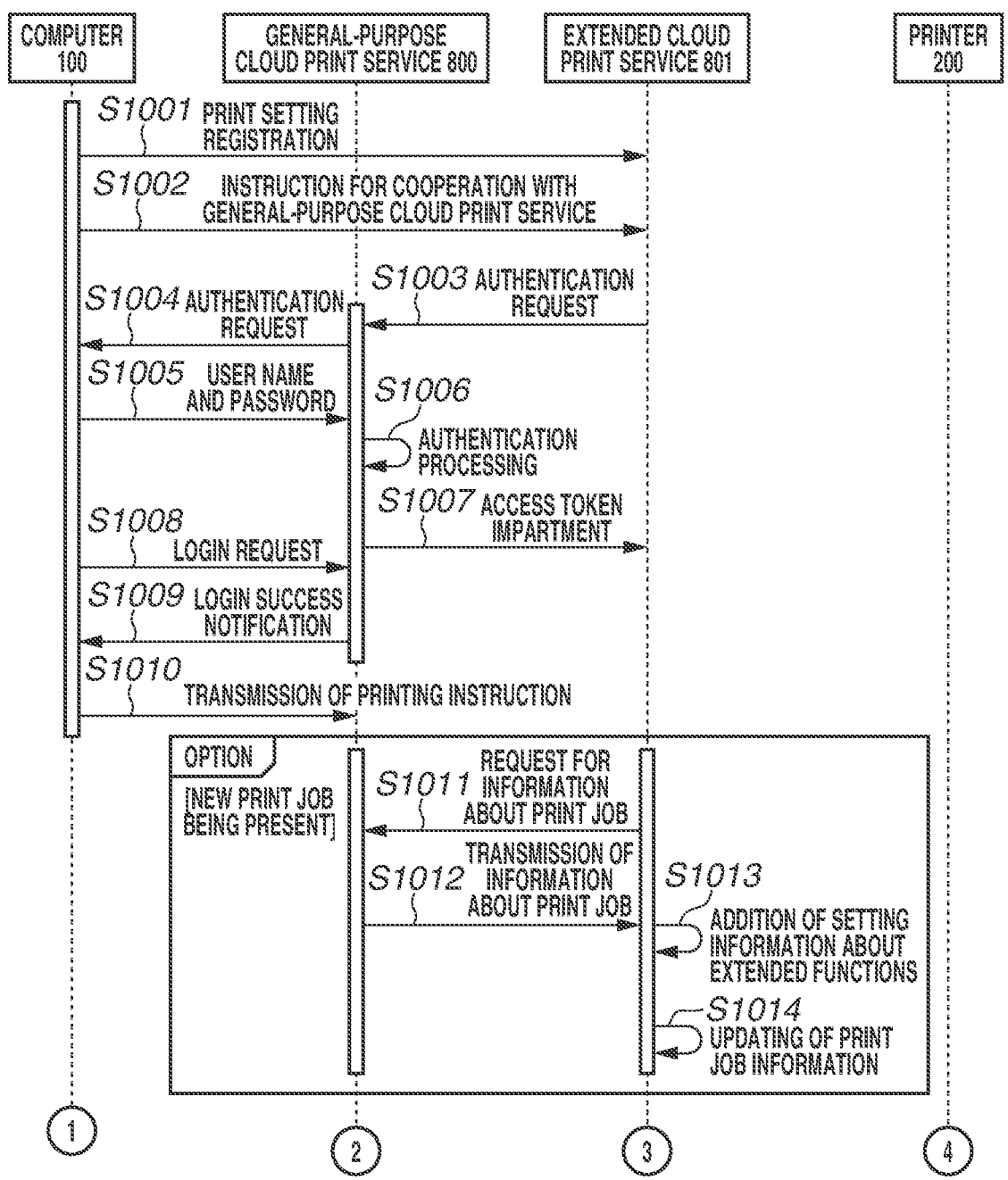
FIGS. 10A and 10B are diagrams illustrating an example of a sequence for performing printing using a printer registered with the extended cloud print service in the first exemplary embodiment.
Figure 10B:
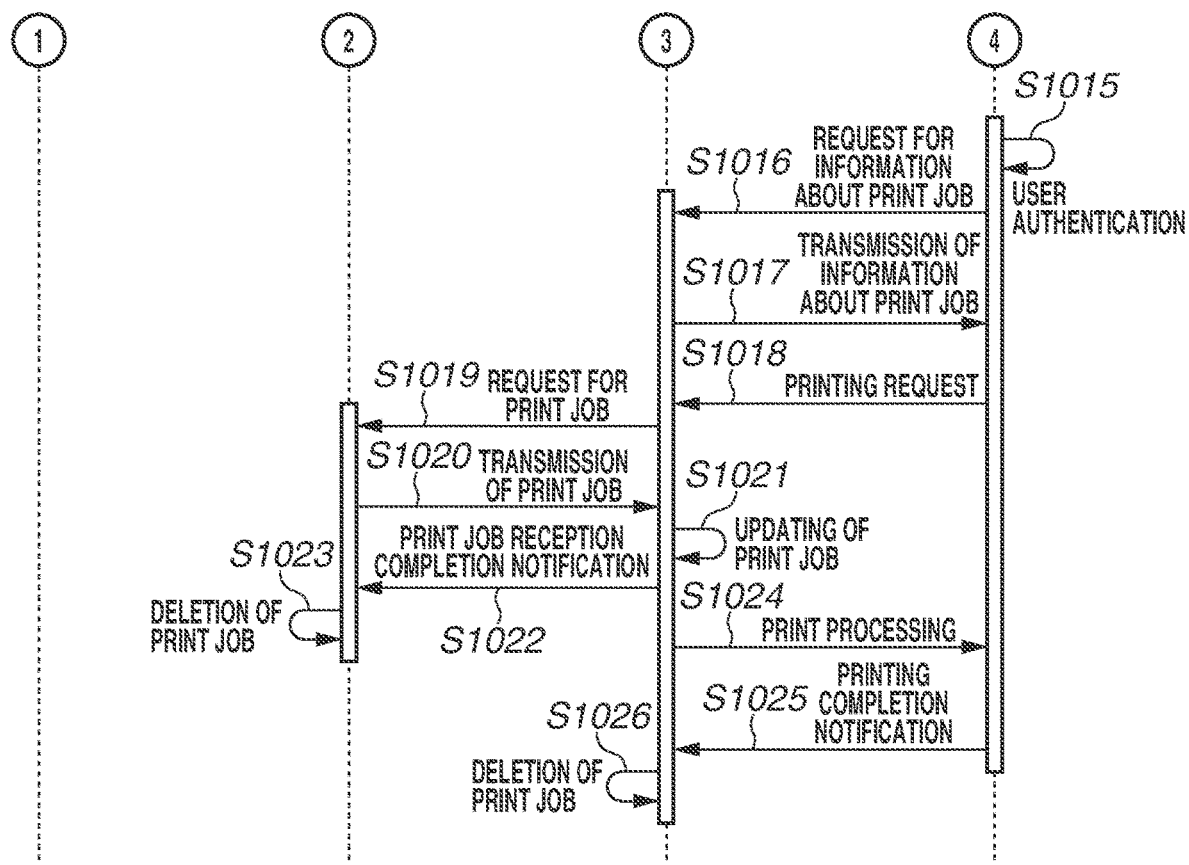
Figure 15:
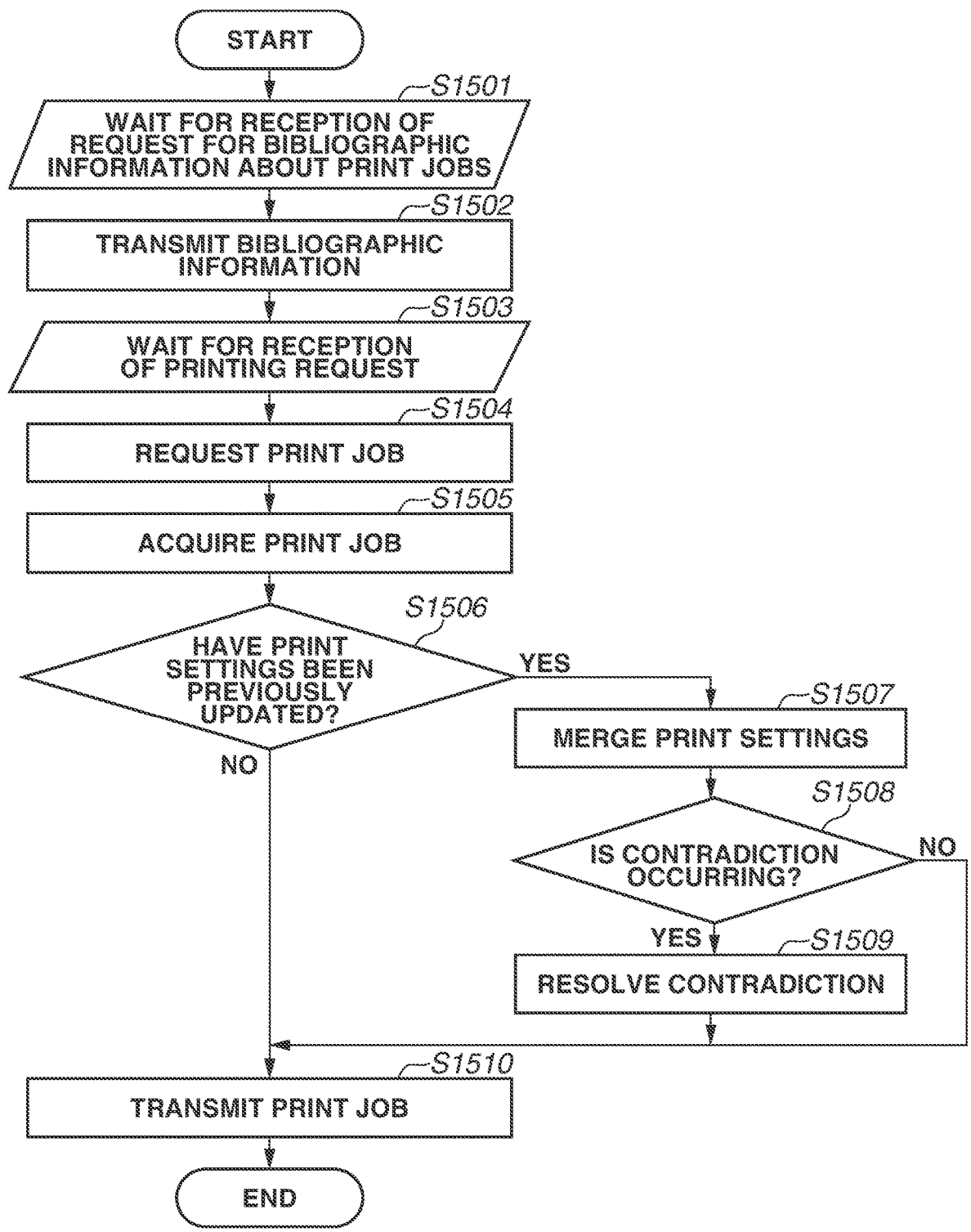
FIG. 15 is a flowchart illustrating print processing which is performed on the extended cloud print service in the first exemplary embodiment.

In the following description, details of the processing which is performed by the extended cloud print service 801 illustrated in FIGS. 10A and 10B are described with reference to FIG. 13 and FIG. 15. Here, FIG. 13 is used to describe synchronous processing for a print job which is performed in conjunction with the general-purpose cloud print service 800, and FIG. 15 is used to describe interactions with the printer 200 and the general-purpose cloud print service 800 during print processing.

Figure 13:
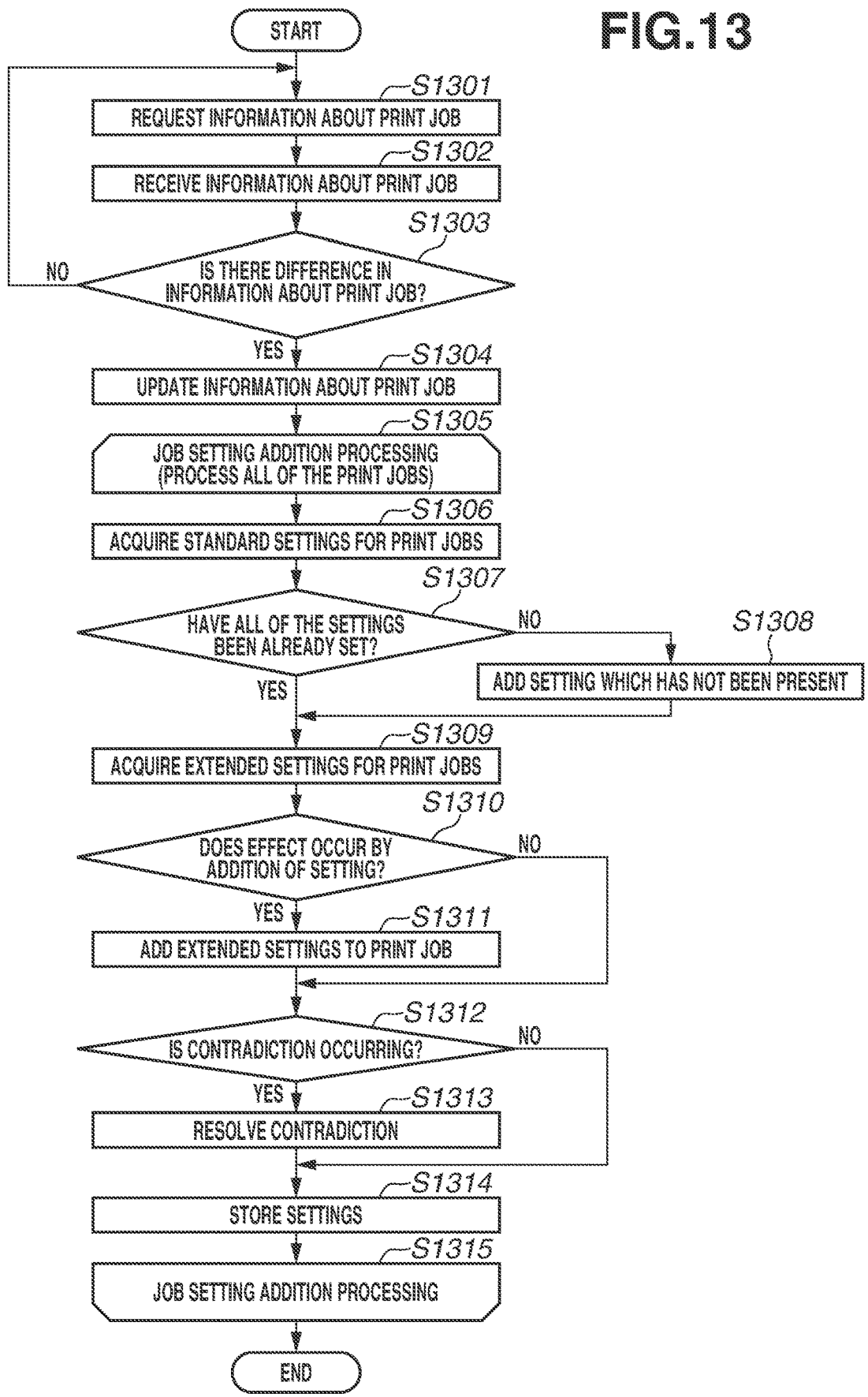
FIG. 13 is a flowchart illustrating processing for registering a print job with the extended cloud print service in the first exemplary embodiment.

FIG. 13 is a flowchart illustrating processing which the extended cloud print service 801 performs to acquire bibliographic information from the general-purpose cloud print service 800. The present flowchart is implemented by a CPU or CPUs of one or a plurality of information processing apparatuses which constitutes the extended cloud print service 801 reading out and executing a program stored in a ROM or a hard disk drive (HDD). There are two purposes of the present flow. One purpose is to acquire information such as "job name" and "printing date and time" used for presenting a list of jobs to the primer 200 when the extended cloud print service 801 performs an interaction with the printer 200. The other purpose is to add unique print settings 1202 which a printer vendor manages to general standard settings 1201 which the general-purpose cloud print service 800 manages.

First, in step S1301, the print job management unit 80106 of the extended cloud print service 801 transmits an acquisition request for information about a print job to the general-purpose cloud print service 800.

In step S1302, the print job management unit 80106 of the extended cloud print service 801 receives information about a print job stored in the general-purpose cloud print service 800. The extended cloud print service 801 acquires bibliographic information and print settings about all of the print jobs registered with the virtual printer of the general-purpose cloud print service 800. The information to be acquired here includes processing information about jobs, display information to be displayed as a list, and print setting information. Specifically, such information is, for example, a job name, a job ID, printing date and time, a user name, the data size of a job, and the setting values of standard settings. This enables displaying information about a print job input via the general-purpose cloud print service 800 without the storage of the extended cloud print service 801 being influenced. Furthermore, in a case where there is room for the storage of the extended cloud print service 801, in this stage, the extended cloud print service 801 can acquire all of the pieces of information including document bodies of jobs.

In step S1303, the print job management unit 80106 of the extended cloud print service 801 determines whether there is a difference between the acquired information about print jobs and information which the extended cloud print service 801 is managing. Step S1303 is performed to check a difference from information obtained at the timing of acquiring bibliographic information about print jobs the previous time, add the added bibliographic information about print jobs to the job list 701, and delete the deleted print jobs from the job list 701. If it is determined that there is no difference (NO in step S1303), the extended cloud print service 801 returns the processing to step S1301 for an acquisition request for bibliographic information and performs polling processing.

If it is determined that there is a difference in information about print jobs (YES in step S1303), then in step S1304, the print job management unit 80106 of the extended cloud print service 801 performs addition and deletion of the updated information about print jobs. The print job management unit 80106 updates bibliographic information and print settings which are managed with the table stored by the storage unit 80101. For example, the print job management unit 80106 receives, from the general-purpose cloud print service 800, bibliographic information about print jobs which is not currently stored in the table managed by the storage unit 80101, and adds the received bibliographic information to the table. On the other hand, in response to not receiving, from the general-purpose cloud print service 800, bibliographic information about print jobs which is currently stored in the table stored by the storage unit 80101, the print job management unit 80106 deletes the bibliographic information about print jobs. Furthermore, with regard to deletion of bibliographic information, the entire bibliographic information about print jobs can be deleted at this timing, or only "setting a deletion flag" can be used. In the case of setting a deletion flag, to later refer to bibliographic information in the "function of, for example, performing printing based on a printing history", the bibliographic information is kept stored without being deleted until a predetermined timing.

The extended cloud print service 801 performs processing in step S1305 to step S1315 with respect to bibliographic information about all of the print jobs to be added to the table managed by the storage unit 80101.

First, in step S1306, the print setting processing unit 80102 of the extended cloud print service 801 acquires standard print settings which are currently set as a default in the extended cloud print service 801. Specifically, in step S1306, the print setting processing unit 80102 acquires the standard print settings by referring to the table illustrated in FIG. 14. For example, in a case where a print job to be added to the table is a print job for the user B, the print setting processing unit 80102 acquires the standard settings associated with the user B based on the table illustrated in FIG. 14. At this time, with respect to setting items which are not set by the user B, the print setting processing unit 80102 acquires the values of the basic settings. On the other hand, in a case where a print job to be added to the table is a print job for a user which is not stored in the table illustrated in FIG. 14, the print setting processing unit 80102 acquires the standard settings in the basic settings.

In step S1307, the print setting processing unit 80102 determines whether all of the items with respect to which setting values have been acquired in step S1306 have already been set. The "standard settings" are also managed by the general-purpose cloud print service 800, and, basically, are values which are previously set. However, a setting may not be present by being deleted, or a setting value may be set blank.

If it is determined that there is an item which is not yet set (NO in step S1307), then in step S1308, the print setting processing unit 80102 determines whether all of the setting items defined in the standard settings are currently set, and sets a setting value registered with the extended cloud print service 801 with respect to an item which is not currently set. If it is determined that all of the items are currently set (YES in step S1307), the print setting processing unit 80102 advances the processing to step S1309 without performing step S1308.

In step S1309, the print setting processing unit 80102 acquires setting values of the extended settings from the table illustrated in FIG. 14. The print setting processing unit 80102 refers to a user name associated with bibliographic information to be added to the table used for managing bibliographic information about print jobs, and acquires setting values of the extended settings to be added. For example, in a case where a print job bibliographic information about which is to be updated is a print job for the user B, the print setting processing unit 80102 acquires the extended settings associated with the user B in the table illustrated in FIG. 14. With respect to a setting item which is not set by the user B, the print setting processing unit 80102 acquires setting values of the basic settings. Moreover, in a case where extended settings associated with a user of the print job bibliographic information about which is to be updated are not stored in the table illustrated in FIG. 14, the print setting processing unit 80102 acquires setting values of the basic settings.

In step S1310, the print setting processing unit 80102 determines whether an effect has occurred by, after acquiring the "extended settings", adding the acquired settings. The print setting processing unit 80102 determines whether each of the setting items of the extended settings is currently set disabled. With respect to a setting item which is set disabled, since, even if the setting item is not added to the print settings, an output result does not change, the print setting processing unit 80102 determines that an effect does not occur (NO in step S1310). On the other hand, in a case where a setting item is not set disabled, the print setting processing unit 80102 determines that the setting item is a setting item the addition of which causes an effect to occur (YES in step S1310), and then performs processing in step S1311.

In step S1311, the print setting processing unit 80102 adds the setting of the setting item determined to be a setting item the addition of which causes an effect to occur to the print settings acquired in step S1304. This enables adding print settings which are set by the extended cloud print service 801 but are not able to be set by the general-purpose cloud print service 800. Furthermore, in the first exemplary embodiment, only a setting item the addition of which causes an effect to occur is added to the print settings acquired from the general-purpose cloud print service 800. However, irrespective of the occurrence of an effect, the setting of a setting item shown in the extended settings in the table illustrated in FIG. 14 can be added to the print settings acquired from the general-purpose cloud print service 800.

After performing addition of the "extended settings", in step S1312, the print setting processing unit 80102 determines whether a contradiction is occurring between the existing "standard settings" and "extended settings". The extended cloud print service 801 stores, in a table, a combination of settings which is not able to be set for one print job with respect to the setting items illustrated in FIG. 4. Furthermore, in this table, in a case where a combination of print settings which is not able to be set for one job is set, the setting value of which setting item to change is stored.

In step S1312, the print job management unit 80106 compares the setting values set for the print job with the table, and determines whether a contradiction setting is set. For example, in a case where, in the state in which the setting of "forced duplex printing" in the "extended settings" is "on", the "standard setting" thereof is "simplex", the print job management unit 80106 determines that a contradiction setting is set.

In step S1313, the print setting processing unit 80102 resolves the contradiction by setting any setting item of the setting items in which a contradiction is occurring to a value determined in the basic settings illustrated in FIG. 14. The print job management unit 80106 changes the setting value of a setting item shown in the table in which a combination of print settings which is not able to be set for one job is stored into a value in the basic settings. For example, in a case where, in the state in which the setting of "forced duplex printing" in the "extended settings" is "on", the "standard setting" thereof is "simplex", the print job management unit 80106 changes the "standard settings" from "simplex" to "duplex".

In step S1314, the print setting processing unit 80102 stores the changed print settings in the storage unit 80101. After advancing the processing to step S1315, if there is a print job with respect to which the addition of extended settings is not yet completed, the print job management unit 80106 returns the processing to step S1305. In a case where the addition of extended settings is completed with respect to all of the print jobs, the print job management unit 80106 ends the processing illustrated in FIG. 13.

Performing the processing illustrated in FIG. 13 enables the extended cloud print service 801 to perform synchronization with a job present on the general-purpose cloud print service 800 and add the unique extended settings to the job.

Next, interactions with the printer 200 and the general-purpose cloud print service 800 performed during print processing are described with reference to FIG. 15. The present processing is performed by the extended cloud print service 801 when the user performs login processing on the display panel of the printer 200, selects a job targeted for printing, and performs printing. The processing illustrated in FIG. 15 is implemented by a CPU or CPUs of one or a plurality of information processing apparatuses which constitutes the extended cloud print service 801 reading out and executing a program stored in a ROM or an HDD.

Figure 7:
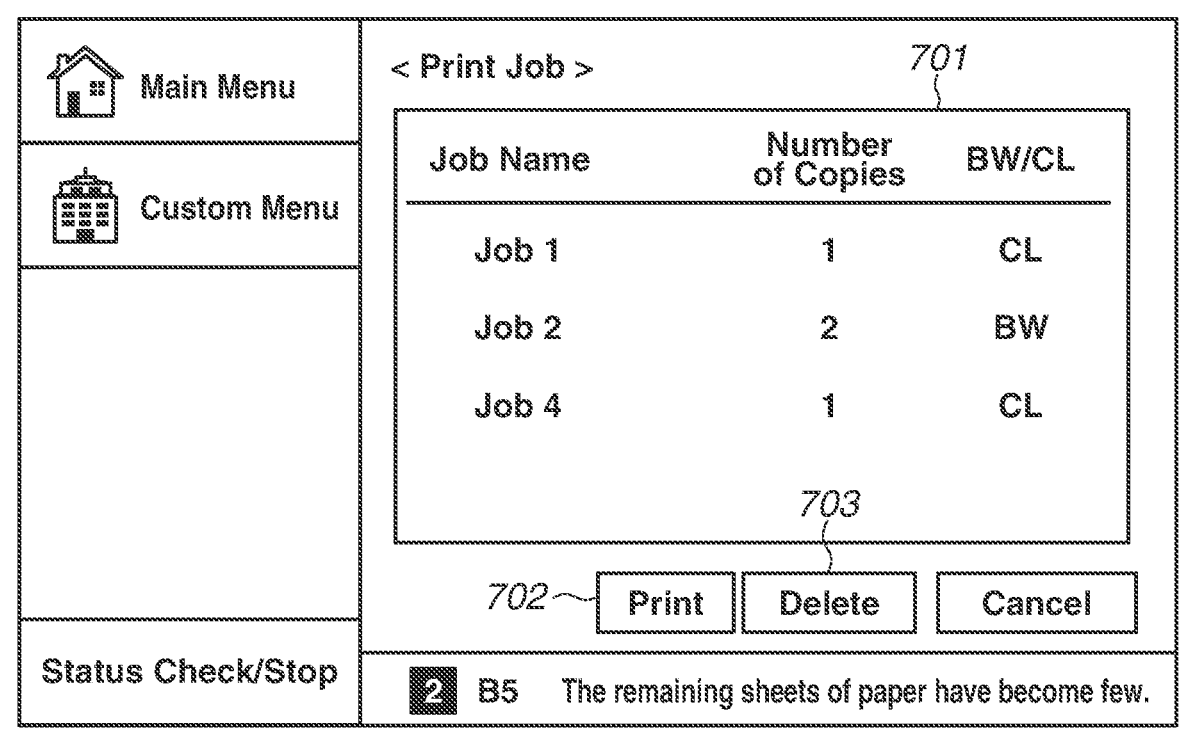

First, with regard to processing which the printer 200 performs immediately before the present flow, when the user performs login processing on the display panel of the printer 200, the printer 200 needs to display the job list 701 illustrated in FIG. 7. Therefore, the printer 200 requests bibliographic information about print jobs, such as a list of jobs and a part of the print settings in each job such as "number of copies", from the extended cloud print service 801. To respond to this request, in step S1501, the print job management unit 80106 of the extended cloud print service 801 waits for reception of a request for bibliographic information about print jobs from the printer 200.

Upon receiving the request for bibliographic information, in step S1502, the operation control unit 80108 of the extended cloud print service 801 transmits, to the printer 200, information which is to be displayed in the job list 701 on the display panel of the printer 200, such as a list of jobs and print settings. This causes the job list 701 illustrated in FIG. 7 to be displayed on the display unit of the printer 200. To receive selection of a job targeted for printing and an instruction for printing from the user, in step S1503, the operation control unit 80108 of the extended cloud print service 801 waits for reception of such a printing request.

In step S1504, upon receiving a request for a print job, the print job management unit 80106 of the extended cloud print service 801 transmits a request for a print job targeted for printing to the general-purpose cloud print service 800. Specifically, in step S1504, the extended cloud print service 801 transmits a request for acquisition of bibliographic information in addition to a request for a document body required for printing. Furthermore, in a case where the capacity of the storage of the extended cloud print service 801 is sufficient and the extended cloud print service 801 has already acquired a document body, the extended cloud print service 801 can request acquisition of only bibliographic information about jobs.

In step S1505, the print job management unit 80106 acquires details of the print job from the general-purpose cloud print service 800.

Then, in step S1506, the print setting processing unit 80102 determines whether the print settings of the acquired print job have previously been updated. This determination is performed because there is a possibility that a print service other than the extended cloud print service 801 has accessed the general-purpose cloud print service 800 and has updated the print settings. The print setting processing unit 80102 compares the standard settings stored in the acquired bibliographic information with the standard settings stored in the extended cloud print service 801, and thus determines whether the print settings have previously been updated.

If it is determined that the print settings have previously been updated (YES in step S1506), then in step S1507, the print setting processing unit 80102 merges the print settings managed by the extended cloud print service 801 and the acquired print settings. At this time, the print setting processing unit 80102 compares the stored information about the date and time at which the print settings were changed with respect to the acquired print job with information about the time at which the print settings stored in the extended cloud print service 801 were changed. The print setting processing unit 80102 updates the setting values to values set in the bibliographic information which is newer in the time at which the print settings were changed. Furthermore, with regard to a time range at which the print settings were updated, the updating date and time can be stored in the print settings or as extended information in a job, and the stored updating date and time can be used. Moreover, the content of which cloud print service to prioritize can be previously set, so that a print job can be executed based on the setting values stored in the cloud print service determined by this setting.

In step S1508, the print setting processing unit 80102 determines whether a contradiction is occurring in the print settings. The processing in step S1508 is processing similar to that in step S1312 illustrated in FIG. 13.

If it is determined that a contradiction is occurring (YES in step S1508), then in step S1509, the print setting processing unit 80102 changes the bibliographic information about the print job with the print settings stored in the cloud print service which is lower in priority. The processing in step S1509 is processing similar to that in step S1313 illustrated in FIG. 13.

Finally, in step S1510, the print job management unit 80106 generates a print job obtained by combining a document body and the updated print settings, and transmits the generated print job to the printer 200. The print job management unit 80106 generates a print job by controlling the image processing unit 80103. Then, the print job management unit 80106 transmits the generated print job to the printer 200.

Performing the above-described processing enables receiving, on the extended cloud print service 801, print processing requested from the printer 200 and performing printing.

Furthermore, these processing operations illustrated in FIG. 13 and FIG. 15 can be performed as respective independent processing operations as long as transaction processing is previously performed in such a manner that no contradiction occurs in internal data.

Performing print processing on a cloud print service in the above-described manner enables applying extended print settings unique to a printer vendor to the print processing even when the user performs print processing via the general-purpose cloud print service 800.

In the above-described first exemplary embodiment, a method of adding unique extended print settings included in the extended cloud print service 801 to the print settings included in the general-purpose cloud print service 800 has been described. In the configuration described in the first exemplary embodiment, it is impossible to perform individual settings for each print job. As a method for solving this issue, processing for acquiring a print setting screen which the extended cloud print service 801 provides and applying print settings to each print job is described in a second exemplary embodiment.

Figure 16:
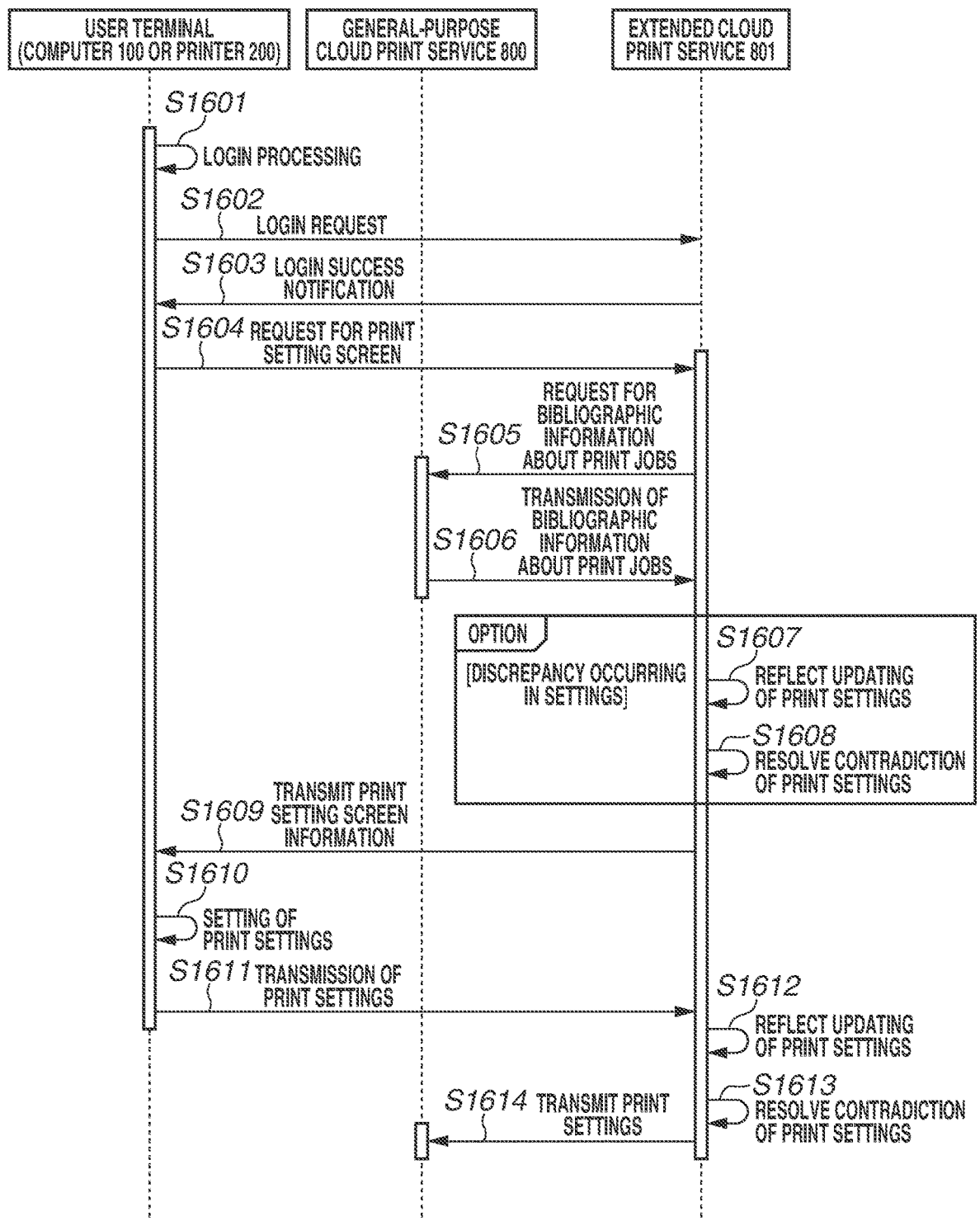
FIG. 16 is a sequence diagram illustrating an example of a sequence for changing print settings on the cloud print services in a second exemplary embodiment.

FIG. 16 is a diagram illustrating a sequence for processing for causing a user terminal to acquire a print setting screen present on the extended cloud print service 801 and apply print settings. Furthermore, the user terminal can be any type of terminal, such as the computer 100 or the printer 200, as long as the user terminal is able to access the extended cloud print service 801 and acquire a print setting screen therefrom. Moreover, while the timing at which to perform the present processing is timing after step S1006 illustrated in FIG. 10, in which a print job was registered on the cloud print service, there is no specific limit to timing as long as transaction processing is previously performed in such a manner that no discrepancy occurs in the settings on the system.

First, in step S1601, the user logs in to the computer 100 or the printer 200.

Next, in step S1602, the user terminal logs in to the extended cloud print service 801, and transmits a login request thereto. The user terminal accesses the extended cloud print service 801, and performs inputting of a user name and a password. The extended cloud print service 801 performs authentication processing with use of the input user name and password.

In step S1603, the extended cloud print service 801 transmits a login success notification to the user terminal.

In step S1604, the user terminal transmits an acquisition request for a print setting screen to the extended cloud print service 801.

In step S1605, before returning a print setting screen to the user terminal, the extended cloud print service 801 transmits a request for bibliographic information to the general-purpose cloud print service 800. This processing is performed to check whether updating of print settings is previously performed by the general-purpose cloud print service 800. In step S1606, the general-purpose cloud print service 800 transmits bibliographic information about print jobs to the extended cloud print service 801.

The extended cloud print service 801 compares the print settings stored therein with the acquired print settings. If there is a difference between two sets of print settings, then in step S1607, the extended cloud print service 801 reflects updating of the print settings with the acquired print settings. Furthermore, in a case where there is a policy to, for example, prioritize the settings latest in update timing or always prioritize the settings in the extended cloud print service 801, this step may not be applicable.

The extended cloud print service 801 determines whether a contradiction setting is set. In a case where a contraction is occurring, such as a case where "although forced duplex printing is set, simplex printing is currently set", then in step S1608, the extended cloud print service 801 performs updating of the print settings to resolve the contradiction. Here, the extended cloud print service 801 determines the setting values of which setting item to change based on a table in which contradiction information is stored. The extended cloud print service 801 changes the setting values of the determined setting item to those of the basic settings.

Figure 17A:
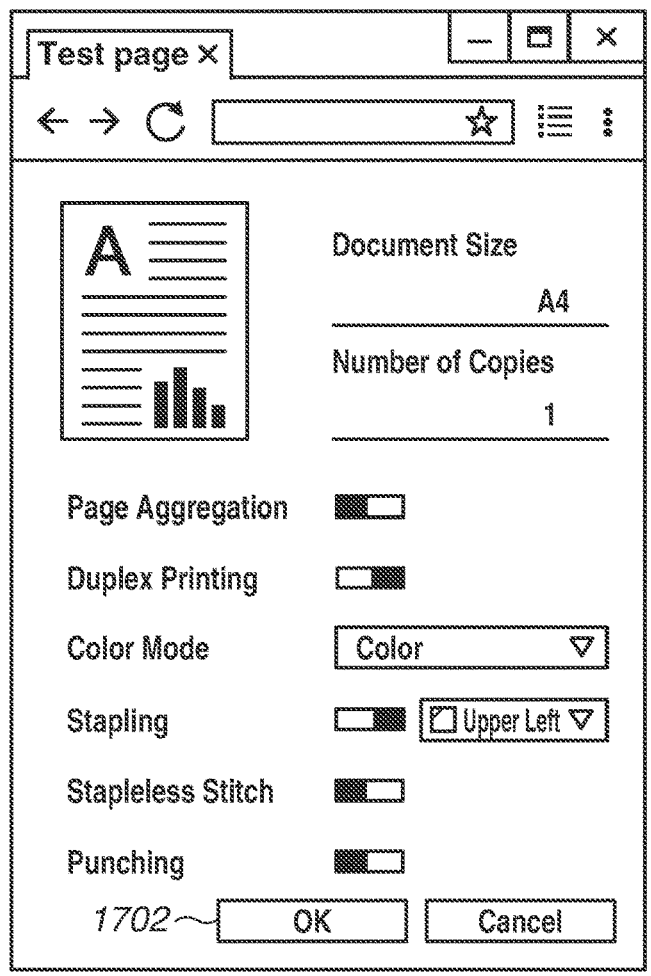
FIGS. 17A and 17B are diagrams each illustrating an example of a screen for print settings which is displayed on a user terminal in the second exemplary embodiment.
Figure 17B:
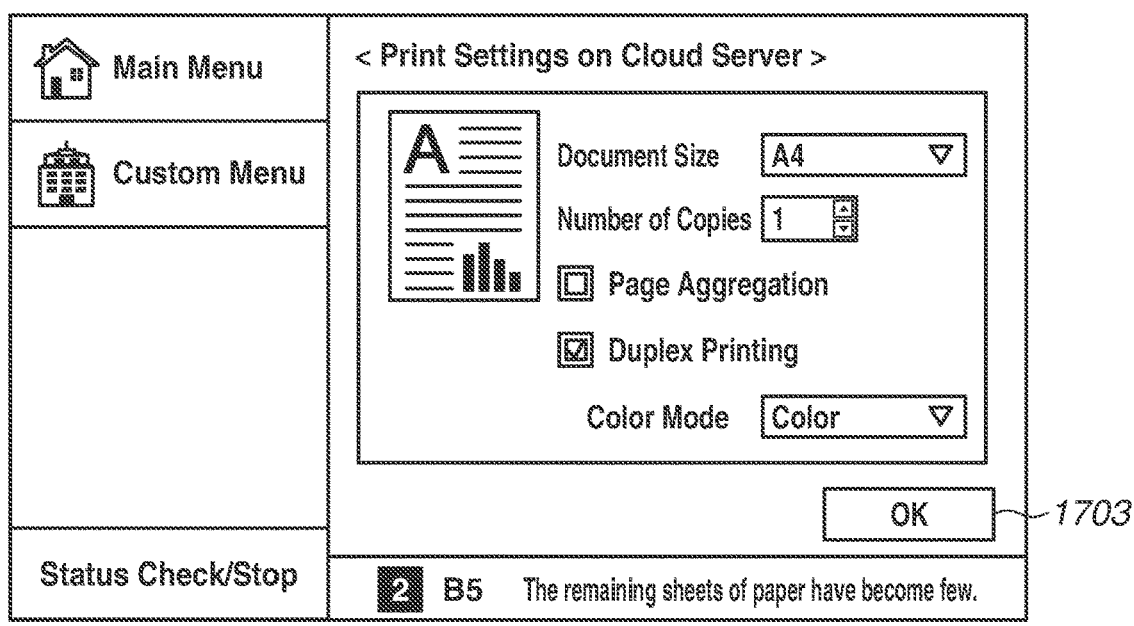

If the consistency of settings has been ensured, then in step S1609, the extended cloud print service 801 transmits a print setting screen (FIG. 17A) to the user terminal. FIG. 17A illustrates an example of a screen which is transmitted in a case where the user terminal which has transmitted a request for a print setting screen is the computer 100. FIG. 17B illustrates an example of a screen which is transmitted in a case where the user terminal which has transmitted a request for a print setting screen is the printer 200. With regard to either screen, a screen enabling setting both the standard settings and the extended settings is displayed on the user terminal.

In step S1610, the user operates the print setting screen displayed on the user terminal, thus performing setting of printing on the screen. When the user selects an "OK" button 1702 or 1703 in the print setting screen, then in step S1611, the user terminal transmits the print settings to the extended cloud print service 801.

In step S1612, the extended cloud print service 801, which has received the print settings set by the user, reflects the print settings received from the user terminal in the print settings shown in the table illustrated in FIG. 9A.

The extended cloud print service 801 determines whether a contradiction is occurring in the print settings. Then, in a case where a contradiction is occurring, then in step S1613, the extended cloud print service 801 resolves the contradiction by performing a method similar to that used in step S1608.

Finally, in step S1614, the extended cloud print service 801 transmits a standard setting portion of the updated print settings to the general-purpose cloud print service 800. The general-purpose cloud print service 800, which has received the standard setting portion, performs, for example, updating of the print settings of a print job which the general-purpose cloud print service 800 is managing.

Performing the above-described processing enables updating the print settings on the cloud print service.

The present disclosure includes performing the following processing. Specifically, the processing supplies software (a computer program) for implementing the functions of the above-described exemplary embodiments to a system or apparatus via a network or various storage media and causing a computer (or a CPU or a micro processing unit (MPU)) of the system or apparatus to read out and execute program code of the software. In this case, the computer program and a storage medium storing the computer program are included in the present disclosure.

A server system according to an exemplary embodiment of the present disclosure enables the user to, even with regard to a print job input to a general-purpose cloud print service, perform printing while appending print settings which are not able to be set by the general-purpose cloud print service to the print job.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-215443, filed Nov. 28, 2019, which is hereby incorporated by reference herein in its entirety.

What is claimed is:

1. A server system comprising:
   an acquisition unit configured to acquire a print setting from a different server system; and
   a transmission unit configured to transmit, to an image forming apparatus, a print job in which a different print setting has been appended to the print setting acquired by the acquisition unit.

2. The server system according to claim 1, wherein the different print setting includes a setting item which is not included in the print setting.

3. The server system according to claim 2, wherein the setting item which is not included in the print setting is at least one of stapleless stitch, setting of forced duplex printing, and bicolor printing.

4. The server system according to claim 1, wherein the print job is print job which is generated by appending the different print setting to print job with the print setting set thereto.

5. The server system according to claim 1, further comprising an appending unit configured to append the different print setting to print job with the print setting acquired by the acquisition unit set thereto,
   wherein the transmission unit transmits, to the image forming apparatus, the print job with the different print setting appended thereto by the appending unit.

6. The server system according to claim 5, wherein the appending unit does not set a setting item which is set in the print setting from among the different setting, and sets a setting item which is not set in the print setting from among the different setting.

7. The server system according to claim 5, wherein, with regard to a setting item which is set in the different print setting and is not set in the print setting, the appending unit appends, to the print setting, a setting which is set in the different print setting.

8. The server system according to claim 1, further comprising:
   a reception unit configured to receive a print job from the different server system; and
   a generation unit configured to generate a print job based on the print job received by the reception unit and the print setting with the different print setting appended thereto.

9. The server system according to claim 1, further comprising a setting unit configured to set the different print setting.

10. The server system according to claim 1, further comprising:
    a second transmission unit configured to transmit an authentication request to the different server system; and
    a reception unit configured to receive an access token issued based on the authentication request transmitted by the second transmission unit.

11. The server system according to claim 10, wherein the acquisition unit acquires a print setting from the different server system with use of the access token received by the reception unit.

12. The server system according to claim 1,
    wherein the server system is able to store the different print setting for each user, and
    wherein the transmission unit transmits, to the image forming apparatus, a print job in which the different print setting stored in association with the user who has input the print job has been appended to the prim setting acquired by the acquisition unit.

13. The server system according to claim 1, wherein the different server system is a server system which is able to designate the server system and instruct the server system to perform printing.

14. The server system according to claim 1, wherein the print job includes image data, the acquired print setting and the different print setting.

15. The server system according to claim 1, wherein the acquisition unit acquires, from the different server system, the print job including image data and the print setting.

16. The server system according to claim 15, wherein the acquired print setting is a print setting included in the print job acquired by the acquisition unit.

* * * * *